(12) United States Patent
Shibahara et al.

(10) Patent No.: US 8,257,178 B2
(45) Date of Patent: Sep. 4, 2012

(54) SERVER APPARATUS, CELLULAR PHONE, OPPONENT SELECTION SYSTEM AND METHOD, PROGRAM, AND RECORDING MEDIUM

(75) Inventors: Mitsuru Shibahara, Tokyo (JP); Aya Suzuki, Tokyo (JP); Jun Takemura, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1164 days.

(21) Appl. No.: 12/110,403

(22) Filed: Apr. 28, 2008

(65) Prior Publication Data

US 2009/0005172 A1     Jan. 1, 2009

(30) Foreign Application Priority Data

Jun. 29, 2007   (JP) .................................. 2007-172541

(51) Int. Cl.
*A63F 13/00*   (2006.01)
(52) U.S. Cl. ............ 463/42; 463/40; 463/41; 379/93.13
(58) Field of Classification Search .............. 463/40–42; 379/93.13
See application file for complete search history.

(56) References Cited

U.S. PATENT DOCUMENTS

| | | | | |
|---|---|---|---|---|
| 6,964,608 B1* | 11/2005 | Koza | ................................ | 463/9 |
| 7,357,718 B2* | 4/2008 | Yamaoka et al. | ............... | 463/41 |
| 7,379,734 B2* | 5/2008 | Sato | .............................. | 455/418 |
| 7,575,518 B2* | 8/2009 | Tabata | ............................ | 463/40 |
| 7,614,955 B2* | 11/2009 | Farnham et al. | ................ | 463/42 |
| 7,628,704 B1* | 12/2009 | Uhlir et al. | ....................... | 463/42 |
| 7,722,467 B2* | 5/2010 | Tabata | ............................ | 463/42 |
| 7,749,085 B2* | 7/2010 | Takahashi et al. | ............. | 463/42 |
| 7,780,533 B2* | 8/2010 | Yamauchi et al. | .............. | 463/42 |
| 7,788,176 B2* | 8/2010 | Gupta et al. | .................... | 705/50 |
| 7,806,768 B2* | 10/2010 | Kobayashi et al. | ............. | 463/43 |
| 7,887,421 B2* | 2/2011 | Tabata | ............................ | 463/42 |
| 7,899,814 B2* | 3/2011 | Tanaka et al. | ................. | 707/724 |
| 7,951,007 B2* | 5/2011 | Wolinsky | ........................ | 463/42 |

(Continued)

FOREIGN PATENT DOCUMENTS

JP     2001-344372     12/2001

OTHER PUBLICATIONS

English language Abstract of JP 2001-344372, Dated Dec. 14, 2001.

*Primary Examiner* — David L Lewis
*Assistant Examiner* — William H McCulloch, Jr.
(74) *Attorney, Agent, or Firm* — Greenblum & Bernstein, P.L.C.

(57) ABSTRACT

Disclosed is a technology that allows a plurality of mobile phones to execute a game. Utilization information is stored for each mobile phone which indicates other mobile phones that have played or tried to play the game with the mobile phone. A request is received from a challenger mobile phone for selecting an opponent of a match-up in the game. Opponent candidates are selected from among the other mobile phones based on the utilization information. A list of the opponent candidates is transmitted to the challenger mobile phone. The challenger mobile phone selects an opponent mobile phone from the list. A match-up challenge is sent to the opponent mobile phone. When acceptance information is received from the opponent mobile phone, match-up start mail is transmitted to the challenger mobile phone and the opponent mobile phone.

17 Claims, 5 Drawing Sheets

U.S. PATENT DOCUMENTS

| | | | |
|---|---|---|---|
| 7,970,390 B2 * | 6/2011 | Fraccaroli | 455/414.3 |
| 8,012,024 B2 * | 9/2011 | Wolinsky | 463/41 |
| 8,016,675 B2 * | 9/2011 | Squibbs | 463/40 |
| 8,032,126 B2 * | 10/2011 | Fraccaroli | 455/414.3 |
| 8,066,572 B1 * | 11/2011 | Timmons et al. | 463/42 |
| 8,077,843 B2 * | 12/2011 | Odeh | 379/93.13 |
| 8,088,007 B2 * | 1/2012 | Tabata | 463/42 |
| 8,147,337 B2 * | 4/2012 | Kitamura et al. | 463/42 |
| 8,162,756 B2 * | 4/2012 | Amaitis et al. | 463/42 |
| 8,162,759 B2 * | 4/2012 | Yamaguchi | 463/42 |
| 8,172,658 B2 * | 5/2012 | Svensson | 463/7 |
| 2001/0034766 A1 | 10/2001 | Morimoto | |
| 2002/0065566 A1 * | 5/2002 | Aronson et al. | 700/91 |
| 2003/0114225 A1 | 6/2003 | Kimura | |
| 2005/0026697 A1 * | 2/2005 | Balahura et al. | 463/42 |
| 2007/0067420 A1 * | 3/2007 | Yamaguchi | 709/219 |
| 2008/0076569 A1 * | 3/2008 | Tabata | 463/41 |
| 2008/0076578 A1 * | 3/2008 | Tabata | 463/42 |
| 2008/0076579 A1 * | 3/2008 | Tabata | 463/42 |
| 2008/0167122 A1 * | 7/2008 | Maeda et al. | 463/30 |
| 2008/0243794 A1 * | 10/2008 | Tanaka et al. | 707/3 |
| 2009/0005172 A1 * | 1/2009 | Shibahara et al. | 463/42 |
| 2009/0239685 A1 * | 9/2009 | Belton et al. | 473/409 |
| 2010/0250652 A1 * | 9/2010 | Suzuki | 709/203 |

* cited by examiner

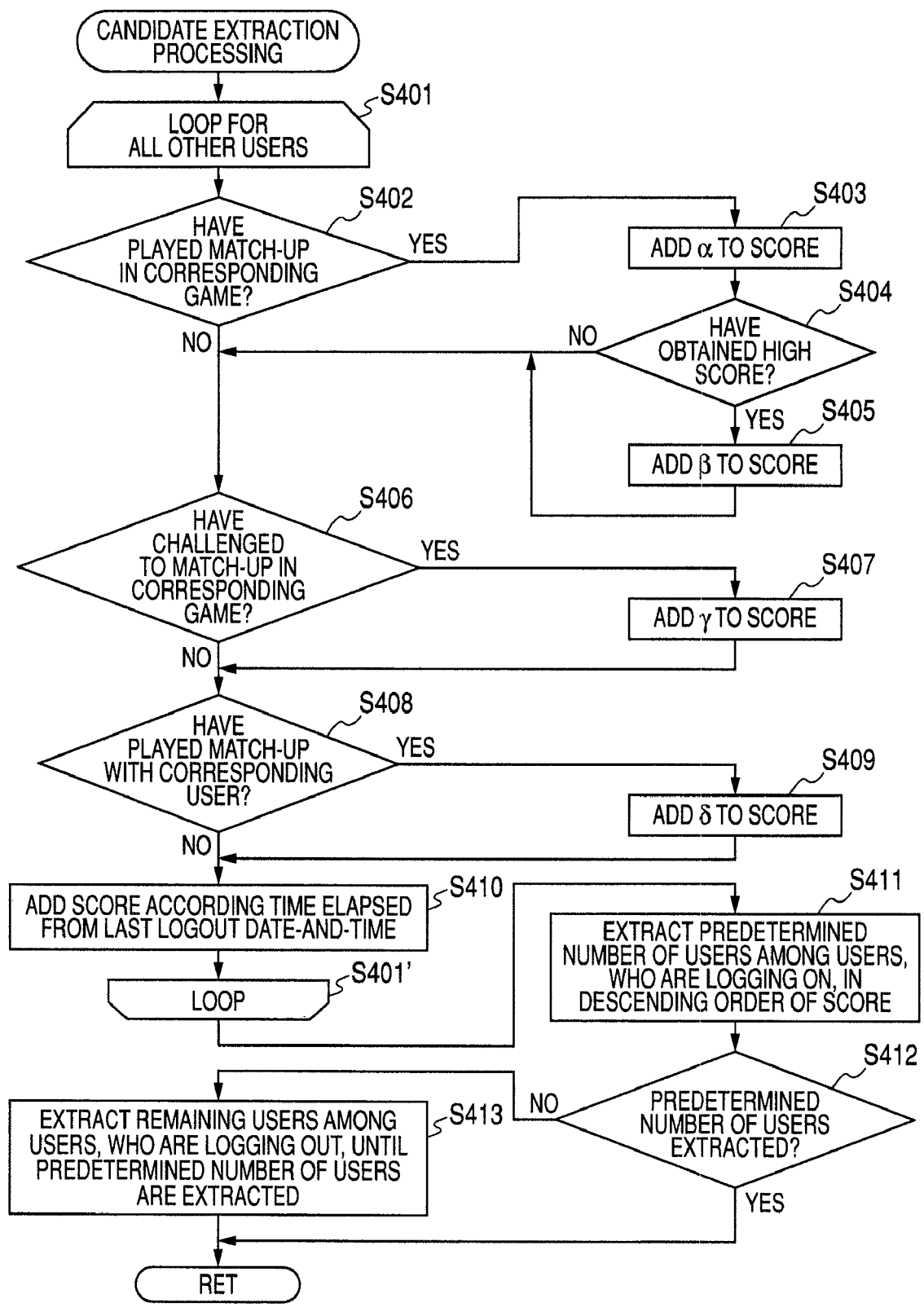

SERVER APPARATUS, CELLULAR PHONE, OPPONENT SELECTION SYSTEM AND METHOD, PROGRAM, AND RECORDING MEDIUM

CROSS REFERENCE TO RELATED APPLICATION

The present disclosure relates to subject matter contained in Japanese Patent Application No. 2007-172541, filed on Jun. 29, 2007, the disclosure of which is expressly incorporated herein by reference in its entirety.

BACKGROUND OF THE INVENTION

1. Field of the Invention

The present invention relates to a technology that allows a mobile phone user to find another mobile phone user to play a match-up in a game.

2. Description of the Related Art

There are known online games (network games) that allow a terminal, such as a personal computer, a game machine, or a mobile phone, to access a server apparatus through a network, and to allow a plurality of users at remote locations to play a game. Among the online games, for example, there is known an online match-up game in which one user plays a match-up with another user at a remote location one-to-one.

A user who wants to play an online match-up game wants to play a match-up at present, and even if a compatible opponent is present in view of a difference in ability, there is no sense if the user cannot find a match-up opponent who can immediately play a match-up with him/her in a game. When many users log on to the online match-up game site that is provided by the server apparatus, it may be expected that a match-up opponent appears comparatively promptly. Meanwhile, in case of a so-called maniac game, it may not be expected that many users are logging on to the online match-up game site.

In the online match-up game, there are many cases where unseen and unknown users at remote locations play a match-up in the game. Accordingly, if a compatible match-up opponent is not selected, the users may not enjoy the game. To overcome this problem, there is suggested a method that finds compatible users on the basis of personal information registered in a personal information database, informs the individual users that they are compatible with each other, and if the users give OKs, and allows the compatible users to share the information (for example, see JP-A-2001-344372 (Paragraphs 0032 and 0033)).

However, as described in JP-A-2001-344372, even if the matching method that finds the compatible users on the basis of the previously registered personal information is applied, in order for a user to immediately play a match-up in the game, the compatible users need to be selected among the users who are logging on to the server apparatus at that time. Meanwhile, in a game in which the number of users who are logging on to the server apparatus at some time may not be expected to begin with, the number of compatible users is limited, and thus the above-described method may make almost no sense.

As described in JP-A-2001-344372, the method that finds the compatible users on the basis of the previously registered personal information is not necessarily applied to a case where the compatible users are selected from the users who are logging on the server apparatus at that time. In this case, however, the individual users who were informed they are compatible with each other may not immediately give the OKs. If so, it may be impossible to meet the user's desire that he/she wants to play a match-up with someone in the online match-up game. In addition, even though a user who has waning interest in the game is informed from the server apparatus that he/she is compatible with other users, it may not be expected that he/she gives the OK.

SUMMARY OF THE INVENTION

It is an object of the invention to provide a server apparatus and the like that allow a user of a mobile phone having a game execution function to easily find another mobile phone user who can immediately play a match-up with him/her in the game.

According to a first aspect of the invention, there is provided a server apparatus that is connected to a plurality of mobile phones having a game execution function through a network including a mobile phone network. The server apparatus includes: a user information storage unit that, for each user, stores information about the utilization indicating the users of the plurality of mobile phones have played a match-up with other users in the game or the users have tried to play a match-up with other users in the game; a selection request receiving unit that receives a selection request for selecting an opponent to play a match-up in the game from each of the plurality of mobile phones through the network; a candidate extracting unit that, in response to the selection request received by the selection request receiving unit, as an opponent candidate with whom a user of a match-up challenger mobile phone, which transmits the selection request, plays a match-up, extracts a user, who is liable to immediately play a match-up in the game, among the users of other mobile phones according to the information about the utilization of each user stored in the user information storage unit; a list transmitting unit that transmits a candidate list, on which the opponent candidates extracted by the candidate extracting unit are listed, to the challenger mobile phone through the network; a selected opponent information receiving unit that receives, from the match-up challenger mobile phone, information about a user selected on the candidate list transmitted from the list transmitting unit; a match-up challenge mail transmitting unit that transmits, to the mobile phone of the user corresponding to the information received by the selected opponent information receiving unit through the network, a match-up challenge mail, which indicates a match-up challenge from the user of the match-up challenger mobile phone; a match-up acceptance information receiving unit that receives, from a match-up acceptor mobile phone, which accepts the match-up challenge of the match-up challenge mail, information about the acceptance of the match-up challenge in regards to the match-up challenge mail transmitted from the match-up challenge mail transmitting unit; and a match-up start mail transmitting unit that, when the match-up acceptance information receiving unit receives the information about the acceptance of the match-up challenge, transmits a match-up start mail, which instructs to start a match-up in the game, to both the match-up challenger mobile phone and the match-up acceptor mobile phone through the network.

The server apparatus stores, for each user, the information about the utilization indicating the users of the plurality of mobile phones have played a match-up with other users in the game or the users have tried to play a match-up with other users. Then, if the selection request is received from a mobile phone (challenger mobile phone) of a user, who wants to play a match-up with other users in the game, among the users of the plurality of mobile phones, the server apparatus extracts, as an opponent candidate, a user, who is liable to immediately play a match-up in the game, according to the information about the utilization of each user. Next, the candidate list on which the extracted opponent candidates are listed is transmitted to the challenger mobile phone.

The user of the challenger mobile phone selects another user to challenge to a match-up in the game according to the candidate list transmitted from the server apparatus. At this time, since the selected user is listed on the candidate list, he/she is liable to accept the match-up challenge from the user of the challenger mobile phone. In addition, the match-up challenge mail is transmitted from the server apparatus to the mobile phone of another user selected by the user of the challenger mobile phone. The match-up challenge mail is a text message on the mobile phone, and thus it can be immediately received by the mobile phone of another user.

The user of the mobile phone that receives the match-up challenge mail is liable to immediately accept the match-up indicated by the match-up challenge mail, and to immediately start a match-up in the game according to the match-up start mail, which is transmitted to the match-up challenger mobile phone and the match-up acceptor mobile phone in response to the information about the acceptance of the match-up. For this reason, the user who wants to play a match-up with another user in the game can easily find another mobile phone user who can immediately play a match-up with him/her in the game.

What does the server apparatus present to the user who wants to play a match-up with another user in the game are just the opponent candidates, and the user determines another user to challenge to a match-up in the game among the opponent candidates. For this reason, it is possible for the user to find the game opponent according to his/her desires that he/she wants to play a match-up again with another user, with whom he/she has played a match-up in the past, or he/she wants to play a match-up with another user, with whom he/she has not played a match-up in the past.

The server apparatus may further include: a game result receiving unit that receives information about the result of the game, which starts according to the match-up start mail transmitted from the match-up start mail transmitting unit, from the match-up challenger mobile phone and the match-up acceptor mobile phone through the network; and a match-up end mail transmitting unit that, when the game result receiving unit receives the information about the result of the game from both the match-up challenger mobile phone and the match-up acceptor mobile phone, transmits a match-up end mail purporting the end of the match-up in the game to both the match-up challenger mobile phone and the match-up acceptor mobile phone through the network.

In this case, information about the result of the game by the match-up challenger mobile phone and information about the result of the game by the match-up acceptor mobile phone are respectively transmitted to the server apparatus, and then the match-up end mail is transmitted to both the mobile phones to end the match-up. For this reason, for example, in case of a game in which the users do not need to play simultaneously, such as a time trial mode, the user who challenges to the match-up and the user who accepts the match-up challenge may execute the game with a time shift. Therefore, each user can play the game according to his/her pace.

The game, which is executed on the match-up challenger mobile phone and the match-up acceptor mobile phone according to the match-up start mail, may be a stand-alone type game, and a score until a predetermined time elapses after the game starts may become the result of the game.

In this case, even if a special game for a match-up among the users is not prepared, a stand-alone type game in which each user plays alone may be used. This game may be bundled with each mobile phone, and the bundled game may be effectively used. Moreover, if the user can play the game many times until the predetermined time elapses after the game starts, the score until the predetermined time elapses after the game starts may be the highest score among the scores.

The match-up end mail may include information that grants a predetermined incentive to the user of the match-up challenger mobile phone and/or the user of the match-up acceptor mobile phone according to the match-up result of the game.

In this way, if the match-up end mail grants the incentive to the user of the match-up challenger mobile phone and/or the user of the match-up acceptor mobile phone according to the match-up result of the game, each user can be motivated to play a match-up with other users in the game.

In the server apparatus according to the first aspect of the invention, the user information storage unit may store, as the information about the utilization, login/logout information about time at which each of the plurality of mobile phones lastly logs on to and/or logs out of the server apparatus. In this case, the candidate extracting unit may preferentially extract, as the opponent candidate, a user who most lastly logs on to or logs out of the server apparatus.

The login/logout information may be information that specifies a mobile phone, which is currently logging on to the server apparatus. In this case, the candidate extracting unit may most preferentially extract, as the opponent candidate, a user of a mobile phone that is currently logging on to the server apparatus.

For example, a mobile phone user who comparatively lately logs on is more liable to accept a match-up of the game than a user who does not log on for a long time. In addition, a mobile phone user who is logging on at present usually wants to play a match-up with other users in the game, and thus he/she is highly liable to accept a match-up in the game. Therefore, if those users are preferentially extracted as the opponent candidates, a user who wants to play a match-up with another user in the game can easily find another mobile phone user who can immediately play a match-up with him/her in the game.

In the server apparatus according to the first aspect of the invention, the user information storage unit may store, for the individual users of the plurality of mobile phones, match-up history information, which specifies another user with whom the user has played a match-up in the game, as the information about the utilization. In this case, the candidate extracting unit may preferentially extract a user, with whom the user of the match-up challenger mobile phone has played a match-up, as the opponent candidate.

For example, each mobile phone user usually wants to play a match-up again with a user who has played a match-up with him/her in the past. In case of such a user, a user who is challenged to a match-up from other users (generally, a predetermined number of users exist) who has played a match-up with him/her in the past is more liable to accept the match-up challenge than a user who is challenged to a match-up from other users (generally, an enormous number of users exist) who did not play a match-up with him/her in the past. Accordingly, the user with whom the user of the match-up challenger mobile phone has played a match-up is preferentially extracted as the opponent candidate. Therefore, a user who wants to play a match-up with other users can easily find another mobile phone user who can immediately play a match-up with him/her.

In the server apparatus according to the first aspect of the invention, a plurality of kinds of games may be executed by the plurality of mobile phones, and each mobile phone may execute at least one of the plurality of kinds of games, and the selection request may assign the kind of a game to play a match-up. In this case, the user information storage unit may store information about the kinds of games in which each mobile phone user has played a match-up with other users, and the candidate extracting unit may preferentially extract a user, who has played a match-up in the game of the kind assigned by the selection request, as the opponent candidate.

Here, when the user information storage unit stores, for each user, the information about the kind of game assigned by the selection request, the candidate extracting unit may preferentially extract a user, who made a selection request assigning the kind of game assigned by the selection request, as the opponent candidate.

When there are a plurality of kinds of games for a match-up, the preference of each mobile phone user may be clearly distinguished. If a user has played a match-up in a game of a kind, the game of that kind is usually a popular game. Then, if a challenge to a match-up in the game of that kind is made, the user is liable to accept the match-up. In addition, in case of a game of a kind that the user challenges another user to a match-up, the game of that kind is usually a popular game. Accordingly, if a challenge to a match-up in the game of that kind is made, the user is very liable to accept the match-up. Therefore, if those users are preferentially extracted as the opponent candidates, a user who wants to play a match-up with another user in the game can easily find another mobile phone user who can immediately play a match-up with him/her in the game.

In the server apparatus according to the first aspect of the invention, the user information storage unit may store information that specifies whether or not each mobile phone user has obtained a predetermined score or more in a game by a match-up with other users. In this case, the candidate extracting unit may preferentially extract a user who has obtained a predetermined score or more in the game by the match-up as the opponent candidate.

If a user who plays a game obtains a predetermined score or more (high score or top ranking) in the game, he/she is often motivated to play the same game. That is, a user who has obtained a predetermined score or more is often motivated to play the game, and if another user challenges to a match-up in the game, the user is liable to accept the match-up. Therefore, if those users are preferentially extracted as the opponent candidates, a user who wants to play a match-up with another user in the game can easily find another mobile phone user who can immediately play a match-up with him/her in the game.

In the server apparatus according to the first aspect of the invention, when the user information storage unit stores information that specifies how many times each mobile phone user plays a match-up with other users in the game, the candidate extracting unit may preferentially extract a user, who has played a match-up with other users in the game many times, as the opponent candidate.

A user who plays a match-up with another user in the game many times usually wants to play a match-up with other users in the game more than a user who few plays a match-up with other users in the game. Then, if a user who wants to play a match-up in the game is challenged to a match-up, the user is liable to accept the match-up. Therefore, if those users are preferentially extracted as the opponent candidates, a user who wants to play a match-up with another user in the game can easily find another mobile phone user who can immediately play a match-up with him/her in the game.

In the server apparatus according to the first aspect of the invention, when information about the acceptance of the match-up challenge is received within a predetermined time after the match-up challenge mail is transmitted, the match-up start mail transmitting unit may transmit the match-up start mail to both the match-up challenger mobile phone and the match-up acceptor mobile phone.

Even if a user of a mobile phone that receives the match-up challenge mail is liable to accept the match-up challenge, there is no telling that he/she surely accepts the match-up challenge. Providing a user who challenges another user to a match-up must wait until the match-up start mail is sent after a challenge to a match-up is made, when the user of the mobile phone that receives the match-up challenge mail does not accept the match-up challenge, a time elapses while a match-up in the game is not played. Even if the time elapsed is extended, possibility to accept the match-up is not always increased. Accordingly, if a time within which a user must accept the match-up challenge of the match-up challenge mail is limited, a user who wants to play a match-up with another user in the game can have a chance to find an additional user to play a match-up in the game.

According to a second aspect of the invention, an opponent selection system includes: a plurality of mobile phones having a game execution function for executing a game; and a server apparatus that is connected to the plurality of mobile phones through a network including a mobile phone network. A user of a predetermined mobile phone among the plurality of mobile phones selects another user as an opponent with whom the user plays a match-up in the game. The predetermined mobile phone includes: a selection request transmitting unit that transmits a selection request for selecting a user of another mobile phone connected to the server apparatus as a match-up opponent in the game to the server apparatus through the network; a candidate list receiving unit that, in response to the selection request from the selection request transmitting unit, receives a candidate list, on which other users as opponent candidates transmitted from the server apparatus are listed; a list display unit that displays the candidate list received by the candidate list receiving unit; a candidate selection unit that selects another user to challenge to a match-up in the game on the candidate list displayed by the list display unit according to a user's operation; a match-up challenge transmitting unit that transmits match-up challenge information indicating another user selected by the candidate selection unit to the server apparatus through the network; a match-up start mail receiving unit that, when another user accepts a match-up of the match-up challenge mail, receives a match-up start mail from the server apparatus; and a game start unit that starts the game execution unit to execute the game according to the match-up start mail received by the match-up start mail receiving unit. The server apparatus includes: a user information storage unit that, for each user, stores information about the utilization indicating the users of the plurality of mobile phones have played a match-up with other users in the game or the users have tried to play a match-up with other users in the game; a selection request receiving unit that receives the selection request transmitted from the selection request receiving unit; a candidate extracting unit that, in response to the selection request received by the selection request receiving unit, extracts an opponent candidate, who is liable to immediately play a match-up in the game, among the users of other mobile phones as the opponent candidate, with whom the user of the predetermined mobile phone plays a match-up in the game, according to the information about the utilization of each user stored in the user information storage unit; a list transmitting unit that transmits the candidate list, on which the opponent candidates extracted by the candidate extracting unit are listed, to the predetermined mobile phone through the network; a match-up challenge information receiving unit that receives the match-up challenge information transmitted from the match-up challenge transmitting unit; a match-up challenge mail transmitting unit that transmits the match-up challenge mail, which indicates the match-up challenge from the user of the predetermined mobile, to the mobile phone of another user, which corresponds to the match-up challenge information received by the match-up challenge information receiving unit, through the network; a match-up acceptance information receiving unit that, from a mobile phone of a user who accepts the match-up challenge of the match-up challenge mail, receives information about the acceptance of the match-up challenge in regards to the match-up challenge mail transmitted from the match-up challenge mail transmitting unit; and a match-up start mail transmitting unit that, when the match-up acceptance information receiving unit receives the information about the acceptance of the match-up challenge, transmits the match-up start mail, which instructs to start a match-up in the game, to both the predetermined mobile phone and the mobile phone, which transmits the information about the acceptance of the match-up challenge through the network. The mobile phone of another user indicated by the match-up challenge information includes: a match-up challenge mail receiving unit that receives the match-up challenge mail transmitted from the match-up challenge mail transmitting unit; a match-up challenge mail display unit that displays the match-up challenge mail received by the match-up challenge mail receiving unit; a match-up acceptance instruction unit that instructs to accept the match-up challenge of the match-up challenge mail displayed by the match-up challenge mail display unit according to a user's operation; a match-up acceptance information transmitting unit that, when the match-up acceptance instruction unit instructs to accept the match-up challenge, transmits the information about the acceptance of the match-up of the match-up challenge mail to the server apparatus through the network, and causes the match-up acceptance information receiving unit to receive the information; a match-up start mail receiving unit that receives the match-up start mail transmitted from the match-up start mail transmitting unit; and a game start unit that starts the game execution unit to execute the game according to the match-up start mail received by the match-up start mail receiving unit.

According to a third aspect of the invention, a mobile phone includes: a network connection unit that performs connection to a network in a server apparatus; a game execution unit that executes a game; a selection request transmitting unit that transmits a selection request for selecting a user of another mobile phone connected to the server apparatus as a match-up opponent in the game to the server apparatus through the network; a candidate list receiving unit that, in response to the selection request transmitted from the selection request transmitting unit, receives a candidate list, which is transmitted from the server apparatus and in which a user who is liable to immediately play a match-up in the game is extracted among the users of other mobile phones as an opponent candidate according to the information about the utilization of each user managed by the server apparatus; a list display unit that displays the candidate list received by the candidate list receiving unit; a candidate selection unit that selects another user to challenge to a match-up in the game on the candidate list displayed by the list display unit according to a user's operation; a match-up challenge transmitting unit that transmits an instruction to transmit a match-up challenge mail to a mobile phone of another user selected by the candidate selection unit to the server apparatus through the network; a match-up challenge mail receiving unit that receives the match-up challenge mail transmitted from the server apparatus on the basis of the instruction from the mobile phone of another user; a match-up challenge mail display unit that displays the match-up challenge mail received by the match-up challenge mail receiving unit; a match-up acceptance instruction unit that instructs to accept the match-up challenge of the match-up challenge mail displayed by the match-up challenge mail display unit according to a user's operation; a match-up acceptance information transmitting unit that, when the match-up acceptance instruction unit instructs to accept the match-up challenge, information about the acceptance of the match-up of the match-up challenge mail to the server apparatus through the network; a match-up start mail receiving unit that receives a match-up start mail, which is transmitted from the server apparatus to both the mobile phone, which transmits the match-up challenge mail, and the mobile phone, which transmits the information about the acceptance of the match-up in response to the information about the acceptance of the match-up; a game result transmitting unit that executes the game through the game execution unit according to the match-up start mail received by the match-up start mail receiving unit, and transmits the result of the game, which started according to the match-up start mail, to the server apparatus through the network; and a match-up end mail receiving unit that receives a match-up end mail transmitted from the server apparatus according to the information about the result of the game transmitted from the game result transmitting unit and the information about the result of the game transmitted from another mobile phone.

According to a fourth aspect of the invention, there is provided an opponent selection method that is executed on a computer apparatus, which is connected to a plurality of mobile phones having a function to execute a game through a network including a mobile phone network. The opponent selection method includes: for each user, storing and managing, in a storage device provided in the computer apparatus, information about the utilization indicating the users of the plurality of mobile phones have played a match-up in the game or the users have tried to play a match-up in the game; causing a communication device provided in the computer apparatus to receive a selection request for selecting an opponent to play a match-up in the game transmitted from each of the plurality of mobile phones through the network; in response to the received selection request, extracting a user, who is liable to immediately play a match-up in the game, among the users of other mobile phones as an opponent candidate, with whom the user of a match-up challenger mobile phone, which transmits the selection request, plays a match-up in the game according to the information about the utilization of each user managed by the storage device; transmitting a candidate list, on which the opponent candidates extracted by the candidate extracting unit are listed, from the communication device to the mobile phone, which transmits the selection request, through the network; causing the communication device to receive information indicating another user selected by the mobile phone, which receives the candidate list, according to the candidate list and transmitted therefrom; transmitting a match-up challenge mail, which indicates a match-up challenge from the user of the mobile phone, which selects another user according to the candidate list, from the communication device to the mobile phone of another user corresponding to the received information through the network; transmitting the match-up challenge mail and causing the communication device to receive information about the acceptance of the match-up challenge transmitted from the mobile phone, which accepts the match-up challenge of the match-up challenge mail; and when the information about the acceptance of the match-up challenge is received, transmitting a match-up start mail, which instructs to start a match-up in the game, from the communication device to both the mobile phone, which transmits the information indicating another user selected according to the candidate list, and the mobile phone, which transmits the information about the acceptance of the match-up challenge, through the network.

According to a fifth aspect of the invention, there is provided a program that is executed on a computer apparatus, which is connected to a plurality of mobile phones having a function to execute a game through a network including a mobile phone network. The program causes the computer apparatus to execute: for each user, storing and managing, in a storage device provided in the computer apparatus, information about the utilization indicating the users of the plurality of mobile phones have played a match-up in the game or the users have tried to play a match-up in the game; causing a communication device provided in the computer apparatus to receive a selection request for selecting an opponent to play a match-up in the game transmitted from each of the plurality of mobile phones through the network; in response to the received selection request, extracting a user, who is liable to immediately play a match-up in the game, among the users of other mobile phones as an opponent candidate, with whom the user of a match-up challenger mobile phone, which transmits the selection request, plays a match-up in the game according to the information about the utilization of each user managed by the storage device; transmitting a candidate list, on which the opponent candidates extracted by the candidate extracting unit are listed, from the communication device to the mobile phone, which transmits the selection request, through the network; causing the communication device to receive information indicating another user selected by the mobile phone, which receives the candidate list, according to the candidate list and transmitted therefrom; transmitting a match-up challenge mail, which indicates a match-up challenge from the user of the mobile phone, which selects another user according to the candidate list, from the communication device to the mobile phone of another user corresponding to the received information through the network; transmitting the match-up challenge mail and causing the communication device to receive information about the acceptance of the match-up challenge transmitted from the mobile phone, which accepts the match-up challenge of the match-up challenge mail; and when the information about the acceptance of the match-up challenge is received, transmitting a match-up start mail, which instructs to start a match-up in the game, from the communication device to both the mobile phone, which transmits the information indicating another user selected according to the candidate list, and the mobile phone, which transmits the information about the acceptance of the match-up challenge, through the network.

The program according to the fifth aspect of the invention may be recorded on a computer-readable recording medium. The computer-readable recording medium may be detachably mounted on the computer apparatus, and it may be a recording medium that is provided separately from the computer apparatus. The computer-readable recording medium may be a recording medium, such as a fixed disc device, which is provided in the computer apparatus and along with the computer apparatus. The program according to the fifth aspect of the invention may be distributed from the server apparatus on the network to the computer apparatus through the network while superimposing data signals on carrier waves.

BRIEF DESCRIPTION OF THE DRAWINGS

FIG. 6 is a flowchart illustrating a candidate extraction processing shown in FIG. 5.

DESCRIPTION OF PREFERRED EMBODIMENT

Hereinafter, a preferred embodiment of the invention will be described with reference to the accompanying drawings.

Figure 1:
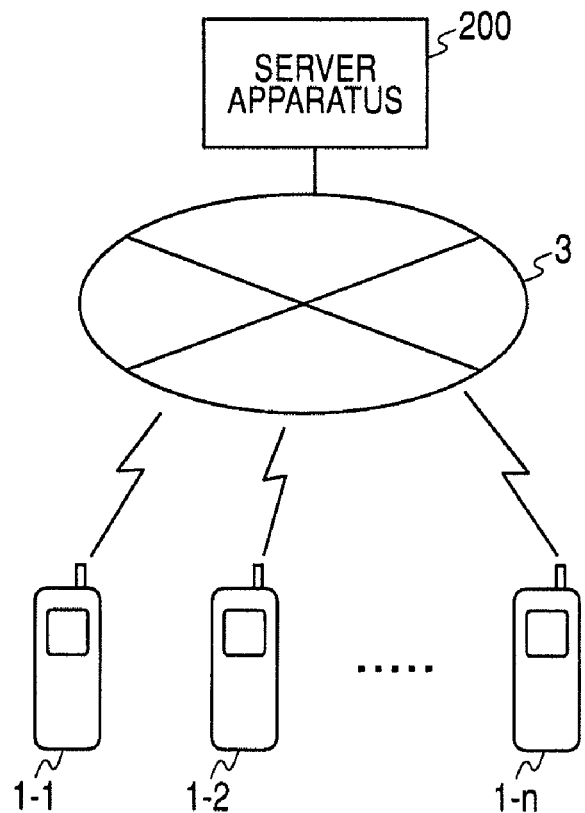
FIG. 1 is a block diagram showing a network system according to an embodiment of the invention.

FIG. 1 is a diagram showing the configuration of a network system that is applied to this embodiment. As shown in FIG. 1, the network system includes a server apparatus 200, and a plurality of mobile phones 1 (1-1 to 1-n) that are connected to the server apparatus 200 through a network 3 including a mobile phone network and Internet.

Each of the mobile phones 1 has a function as a computer apparatus including a network connection function, and it can view a site, which is provided by the server apparatus 200, through an internal browser. The mobile phone 1 may execute a game with the function as the computer apparatus. The mobile phone 1 has a mail exchange function, and insofar as it can exchange signals with a base station (not shown), it may receive a mail that reaches the base station, with which the signals are being exchanged. Accordingly, if a mail is sent from the server apparatus 200 to the network 3, the mail immediately reaches the mobile phone 1.

The server apparatus 200 provides a site (hereinafter, referred to as 'opponent selection site') in which the user of the mobile phone 1 selects an opponent in the game. The opponent selection site helps the users of the plurality of mobile phones 1 to select the opponents to play match-up in the game, but does not provide a game in which the plurality of users play match-up in the game. That is, a user who wants to play a match-up with a user of another mobile phone 1 in a game challenges the user of another mobile phone 1 as a match-up opponent candidate on the opponent selection site to a match-up in the game, and if the user who is challenged to the match-up accepts the match-up, the match-up in the game starts. After the match-up in the game ends, game items are moved between the users according to the match-up result.

Specifically, a user who wants to play a match-up with a user of another mobile phone 1 in the game assigns a kind of a game to play a match-up, and logs on his/her mobile phone 1 to the opponent selection site, which is provided by the server apparatus 200. If login is authorized, a page on which the users of other mobile phones 1 who are liable to play a match-up in the game of that kind are listed as the match-up opponent candidates is individually created, and is then transmitted to the mobile phone 1 of the corresponding user.

The user who wants to play a match-up with the user of another mobile phone 1 in the game selects one among the match-up opponent candidates listed on the displayed opponent selection site, and informs the server apparatus 200 of the selected match-up opponent candidate. Then, a match-up challenge mail is transmitted from the server apparatus 200 to the mobile phone 1 of the user as the selected match-up opponent candidate. The user who receives the match-up challenge mail instructs to accept the match-up challenge of the match-up challenge mail and informs the server apparatus 200 of the match-up acceptance. Then, a match-up start mail is transmitted to both the mobile phone 1 of the user who challenges to a match-up and the mobile phone 1 of the user who is challenged to the match-up.

The user who challenges to the match-up and the user who is challenged to the match-up execute the game on their mobile phones 1 according to the match-up start mail, respectively. Then, when a predetermined time elapses, the individual mobile phones 1 inform the server apparatus 200 of the game results. The server apparatus 200 transmits a match-up end mail to both the mobile phones 1 according to the game results from the individual mobile phones 1. According to the match-up end mail, a game item is moved from a user who lost the match-up to a user who won the match-up.

Figure 2:
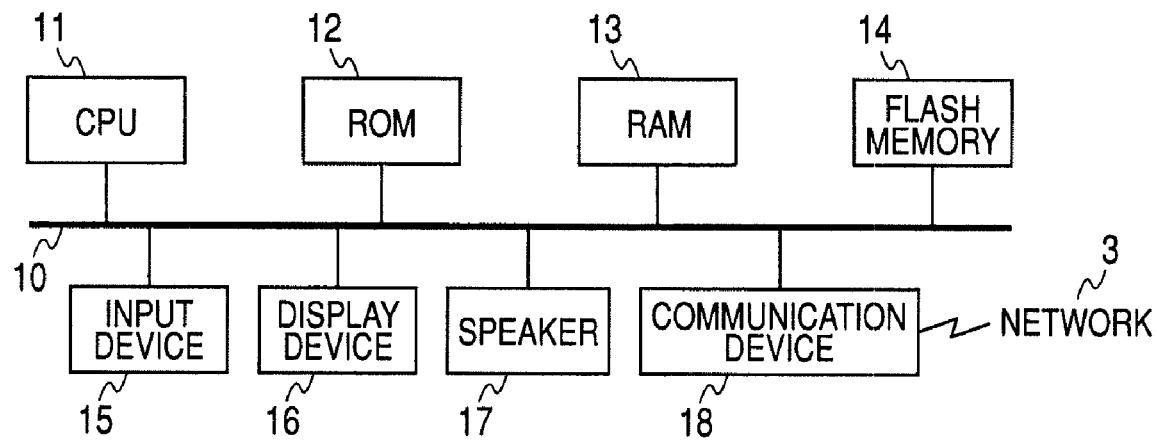
FIG. 2 is a block diagram showing the configuration of a mobile phone shown in FIG. 1.

FIG. 2 is a block diagram showing the configuration of the mobile phone 1 shown in FIG. 1. As shown in FIG. 2, the mobile phone 1 includes a CPU (Central Processing Unit) 11, a ROM (Read Only Memory) 12, a RAM (Random Access Memory) 13, a flash memory 14, an input device 15, a display device 16, a speaker 17, and a communication device 18. The mobile phone 1 has a camera for capturing an image or the constituent elements required for telephone calls, but they are not in immediate connection with the invention and are not shown in FIG. 2.

The CPU 11 executes a program that is stored in a program area of the RAM 13, and performs a processing required to execute the game. The ROM 12 is a storage device, in which an OS program of the CPU 11, an application program bundled with the mobile phone 1, fixed data used in these programs, or sample data are stored in advance.

The application program that is bundled with the mobile phone 1 and stored in the ROM 12 in advance includes a browser program for reading the opponent selection site provided by the server apparatus 200, or a game program. As described below, each mobile phone 1 stores one or more kinds of game programs for game, in which an item is acquired as the game is executed, including a program stored in the flash memory 14. An item that is acquired as the game is executed is managed by the RAM 13 or the flash memory 14 according to the kind of game.

A game for a match-up between the users of the mobile phones 1 is not necessarily a network game (not excluding the network game). For example, the game may be a stand-along type game insofar as the game result can be represented by scores, such as marks or time, to compare good and bad, and an item acquired as the game is executed may be used. In addition, the game may not be a specific game when the opponent selection site is used.

The RAM 13 is a storage device that is used as a main memory of the CPU 11. The contents stored in the RAM 13 are erased when the mobile phone 1 is turned off. The flash memory 14 is a storage device that is electrically writable/erasable, but the contents stored therein are not erased even if the mobile phone 1 is turned off. The flash memory 14 is a storage device that is used as an auxiliary memory of the CPU 11. The flash memory 14 may store a game program that is downloaded from a server apparatus on the network 3 (it may be identical to or different from the server apparatus 200, which provides the opponent selection site).

The input device 15 includes numeric keys '1' to '0', a '*' key, a '#' key, direction keys, and an enter key, and inputs required information to the CPU 11 according to a user's operation. The direction keys of the input device 15 may input four directions, but a left key and a right key are used to return or progress a display page by the browser. While reading the opponent selection site, the user operates up and down keys to sequentially select the match-up opponent candidates listed on the opponent selection site. Here, if the user operates the enter key, detailed information of a corresponding match-up opponent candidate is obtained. Then, the user operates the up and down keys to select an item 'challenge to match up', and then operates the enter key to confirm an opponent to challenge to a match-up.

During the operation in an item selection menu described below, only the up key and the down key among the 4 direction keys may be used. That is, a selected item on the item selection menu described below is changed by the input from the up key or the down key. The enter key of the input device 15 is used to confirm a selected item on the item selection menu described below, and instruct to execute a processing according to the corresponding item.

The display device 16 may be a liquid crystal display, and displays the opponent selection site provided by the server apparatus 200, or a screen of a game, which is executed by a match-up challenged/accepted through the opponent selection site. The speaker 17 outputs an incoming mail tone when a mail is incoming. The communication device 18 transmits and receives information to and from the server apparatus 200 through the network 3. The information that is transmitted and received to and from the server apparatus 200 includes the above-described opponent selection site or various kinds of mails.

Figure 3:
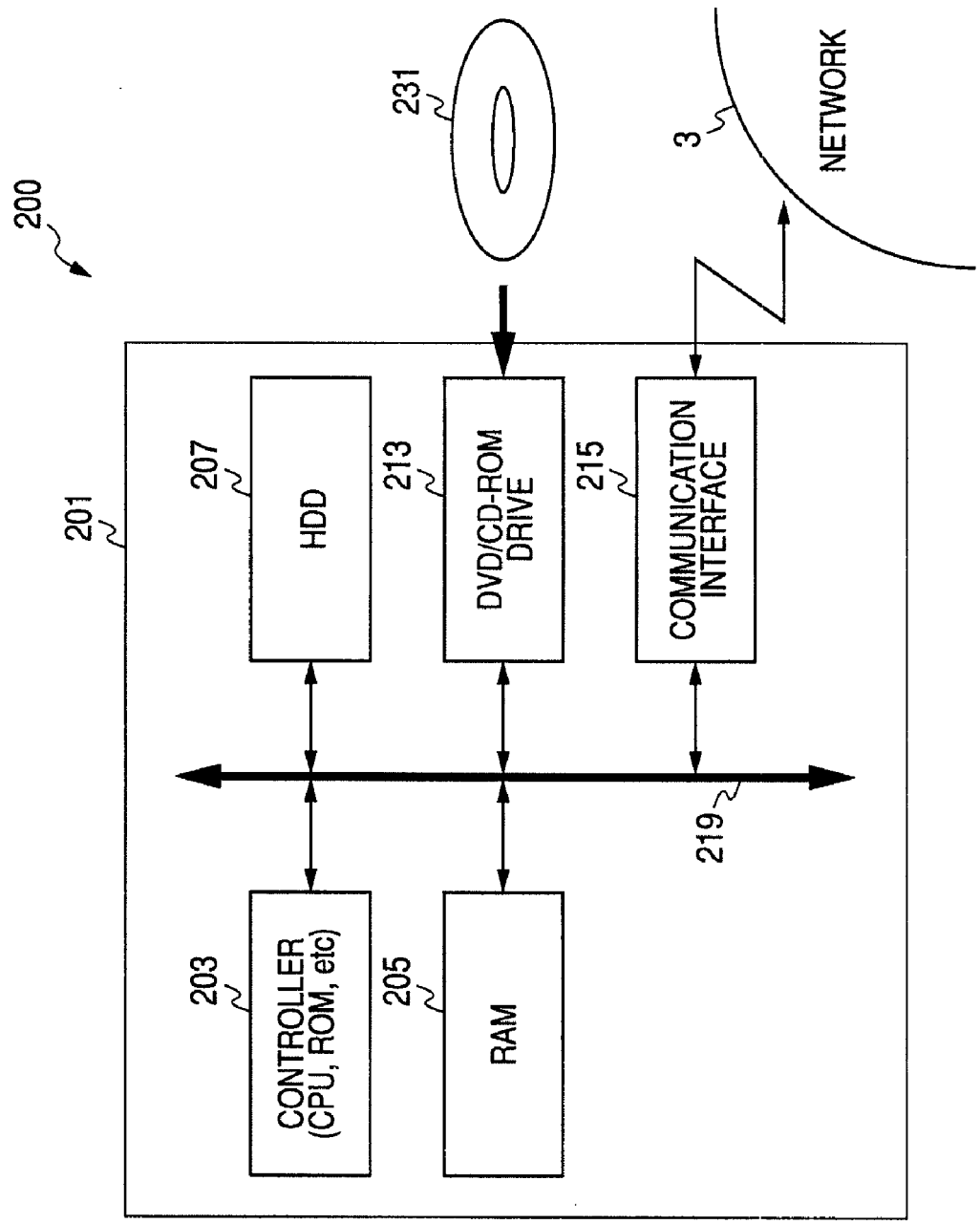
FIG. 3 is a block diagram showing the configuration of a server apparatus shown in FIG. 1.

FIG. 3 is a block diagram showing the configuration of the server apparatus 200 shown in FIG. 1. As shown in FIG. 3, the server apparatus 200 is constructed laying focus on a server main body 201. The server main body 201 includes a controller 203, a RAM 205, a hard disc drive (HDD) 207, a DVD/CD-ROM drive 213, and a communication interface 215, all of which are connected to an internal bus 219. In the DVD/CD-ROM drive 213, a recording medium (DVD-ROM or CD-ROM) 231 may be mounted.

The controller 203 includes a CPU (Central Processing Unit) or a ROM (Read Only Memory), executes a program stored in the HDD 207 or recorded on the recording medium 231, and controls the server apparatus 200. The controller 203 includes an internal timer that checks a current time. The RAM 205 is a work area of the controller 203. The HDD 207 is a storage area that stores programs or data. The communication interface 215 is connected to the network 3 and performs communication with video game machines 100.

The program and data for playing a network game by the server apparatus 200 are initially stored in the recording medium 231 and then installed in the HDD 207. Next, the program and data are read out from the HDD 207 when the game is executed, and loaded to the RAM 205. The controller 203 processes the program and data loaded to the RAM 205, and progresses the network game on the basis of messages transmitted from the video game machines 100. Intermediate data when the controller 203 performs a processing is stored in the RAM 205.

Next, the opponent selection site that is provided by the server apparatus 200 to the mobile phone 1 will be described. The opponent selection site is individually created by extracting the user of another mobile phone 1, who is liable to play a match-up in the game, as a match-up opponent candidate when any one mobile phone 1 assigns a kind of a game to play a match-up and logs on to the server apparatus 200.

Figures 4A, 4B:
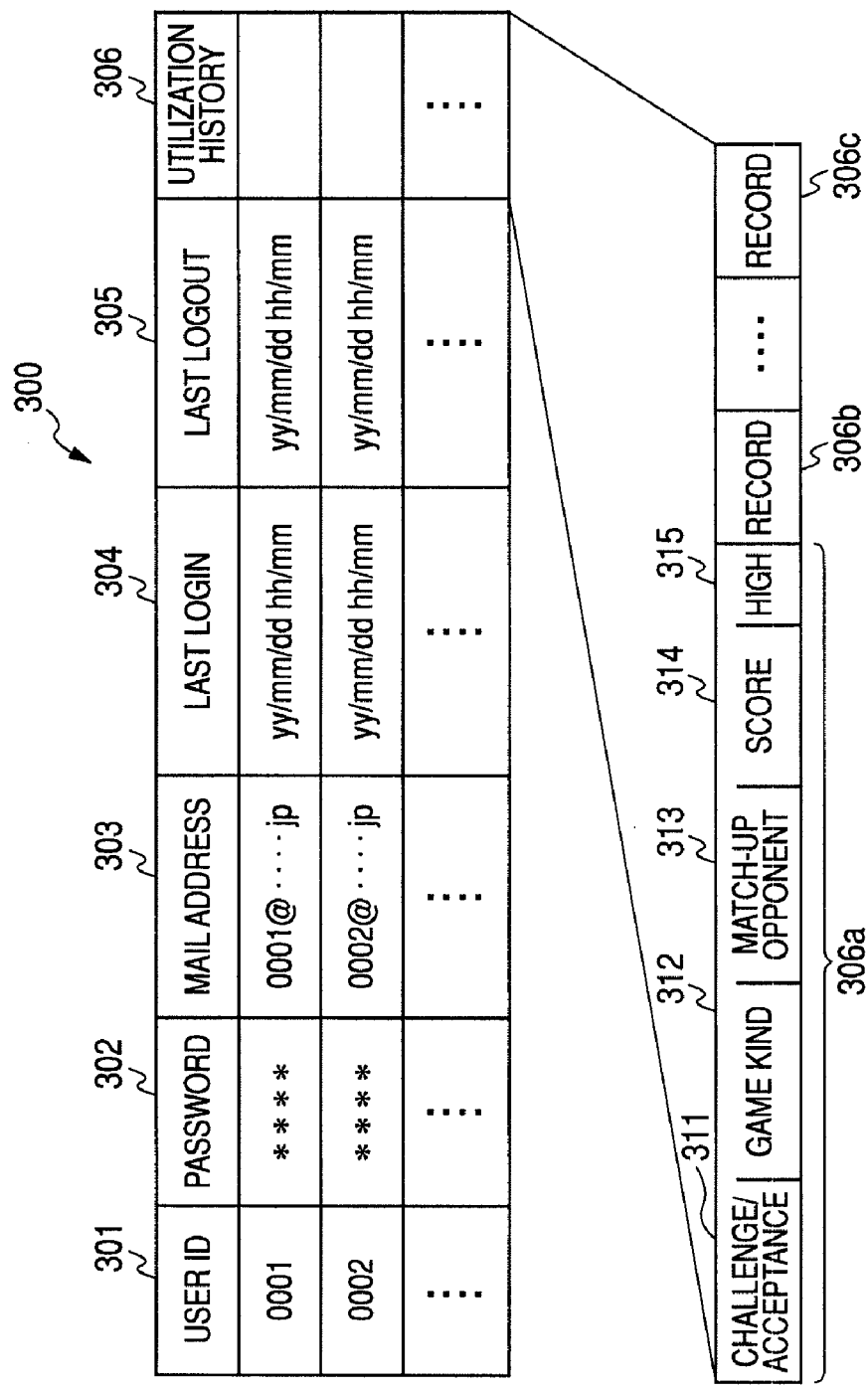
FIGS. 4A and 4B are diagrams showing a user information table that is managed in a server apparatus shown in FIG. 1.

FIGS. 4A and 4B are diagrams of a user information table that is managed by the storage device (RAM 205 or HDD 207) of the server apparatus 200 to individually create the opponent selection site for a mobile phone 1, which logs on to the server apparatus 200. As shown in FIG. 4A, a user information table 300 registers the users of the mobile phones 1 in association with a user ID 301, a password 302, a mail address 303, a last login date-and-time 304, a last logout date-and-time 305, and a utilization history 306.

The user ID 301 is identification information that is used to uniquely identify the user of each mobile phone 1, and becomes authentication information that is used for authentication when each mobile phone 1 logs on to the opponent selection site, which is provided by the server apparatus 200. The password 302 is authentication information that is used for authentication when each mobile phone 1 logs on to the opponent selection site, along with the user ID 301. When the mobile phone 1 logs on to the opponent selection site, it is necessary to assign the kind of a game to play a match-up. The mail address 303 is a mail address that is used when each mobile phone 1 exchanges mails with other mobile phones 1.

The last login date-and-time 304 indicates date and time when each mobile phone 1 lastly logs on to the opponent selection site. The last logout date-and-time 304 indicates date and time when each mobile phone 1 lastly logs out of the opponent selection site. When each mobile phone 1 newly logs on to the opponent selection site, the last login date-and-time 304 is updated to that time, and the last logout date-and-time 305 is erased.

That is, the last login date-and-time 304 is registered in the user information table 300, and it is considered that a mobile phone 1 whose last logout date-and-time 305 is not registered is logging on to the opponent selection site at present. In addition, each mobile phone 1 logs out of the opponent selection site when a logout request is transmitted to the server apparatus 200 according to the user's operation of the input device 15. Meanwhile, even if the logout request is not transmitted, if the mobile phone 1 does not transmit any information to the server apparatus 200 during a predetermined time while being logging on is automatically logged out of the opponent selection site by the server apparatus 200.

The utilization history 306 indicates histories of the user of each mobile phone 1, for example, when the user has found a game opponent using the opponent selection site, or the user has played a match-up in the game with an opponent found using the opponent selection site. Records 306a to 306d of the utilization history are created each time the user challenges another user to a match-up or each time another user challenges the user to a match-up. As shown in FIG. 4B, each of the records 306a to 306d includes the kind of match-up challenge/acceptance to/from another user (hereinafter, simply referred to as 'challenge/acceptance kind') 311, a game kind 312, a match-up opponent 313, a score 314, and a high score flag 315.

The challenge/acceptance kind 311 refers to information that indicates either whether another user is challenged to a match-up or whether another user challenges to a match-up. If a user challenges another user to a match-up, the records 306a to 306d of the utilization history are newly created, regardless of whether or not the match-up challenge is accepted. Meanwhile, even if another user challenges a user to a match-up, when the match-up challenge is not accepted, the records 306a to 306d of the utilization history are not created.

The game kind 312 indicates the kind of a game in which another user challenges to a match-up or is challenged to a match-up. The match-up opponent 313 indicates a user who challenges to a match-up (when the challenge/acceptance kind 311 indicates that another user challenges to a match-up) or a user who is challenged to a match-up (when the challenge/acceptance kind 311 indicates that another user is challenged him/her to a match-up). However, when a match-up challenge to another user is not accepted, the match-up opponent 313 remains blank.

The score 314 indicates a game score as the result of a match-up to which another user challenges or is challenged in the game. The high score flag 315 is a flag indicating whether or not the score registered in the score 314 was a high score when the corresponding match-up ends. Moreover, a high score per game kind is managed by the storage device of the server apparatus 200 (RAM 205 or HDD 207), separately from the user information table 300.

Next, a match-up opponent candidate selection procedure for the opponent selection site provided by the server apparatus 200 to a mobile phone 1, which logs on to the opponent selection site will be described. A predetermined number of match-up opponent candidates are extracted among the users other than the user of the mobile phone 1, which logs on to the server apparatus 200. In regards to the users as the match-up opponent candidates, a user who is liable to play a match-up with a match-up opponent candidate in the game of the kind assigned by the match-up opponent candidate is preferentially extracted. Specifically, the match-up opponent candidates are extracted according to whether or not they are logging on to the opponent selection site at present and the score of the goodness of fit, which is calculated as follows.

For a user who has played a match up in the game of the assigned kind during being logging on (regardless of whether or not a match-up challenger is an opponent), α (constant) is added to the score of the goodness of fit. For a user who has obtained a high score in the game of the assigned kind during being logging on, β (constant) is further added to the score of the goodness of fit. In regards to a user who has challenged to a match-up in the game of the assigned kind during being logging on (regardless of whether or not the user actually plays a match up), γ (constant) is added to the score of the goodness of fit. For a user who has played a match-up with the user of the login mobile phone 1 (regardless of whether or not a game to be executed is the game of the assigned kind), δ (constant) is added to the score of the goodness of fit. In addition, a value according to the time elapsed from the last login date-and-time is added to the score of the goodness of fit of each user.

If the number of users of the mobile phones 1 that are logging on to the opponent selection site at present reaches a predetermined number, a predetermined number of users are extracted among the users, who are logging on, in a descending order of the score of the goodness of fit. In addition, if the number of users of the mobile phones 1 that are logging on to the opponent selection site does not reach the predetermined number, remaining match-up opponent candidates are extracted among the users, who are not logging on, in a descending order of the score of the goodness of fit until the predetermined number of match-up opponent candidates are extracted.

As such, the match-up opponent candidate to be listed on the opponent selection site may include the users, who are logging on, and the users, who are not logging on. In this case, on the opponent selection site, they may be displayed on the display device 16 so as to be distinguished from each other.

Hereinafter, in the network system according to this embodiment, processings to be executed by a plurality of mobile phones 1 and the server apparatus 200 will be described. The users of the plurality of mobile phones 1 play a match-up in the game, but on an assumption that a match-up in the game is played, a user (match-up challenger) who challenges another user to a match-up and a user (match-up acceptor) who accepts a match-up challenge by another user exist. In the following description, a processing, which is executed by the mobile phone 1 of the match-up challenger, and a processing, which is executed by the mobile phone 1 of the match-up acceptor, will be separately described.

Figure 5:
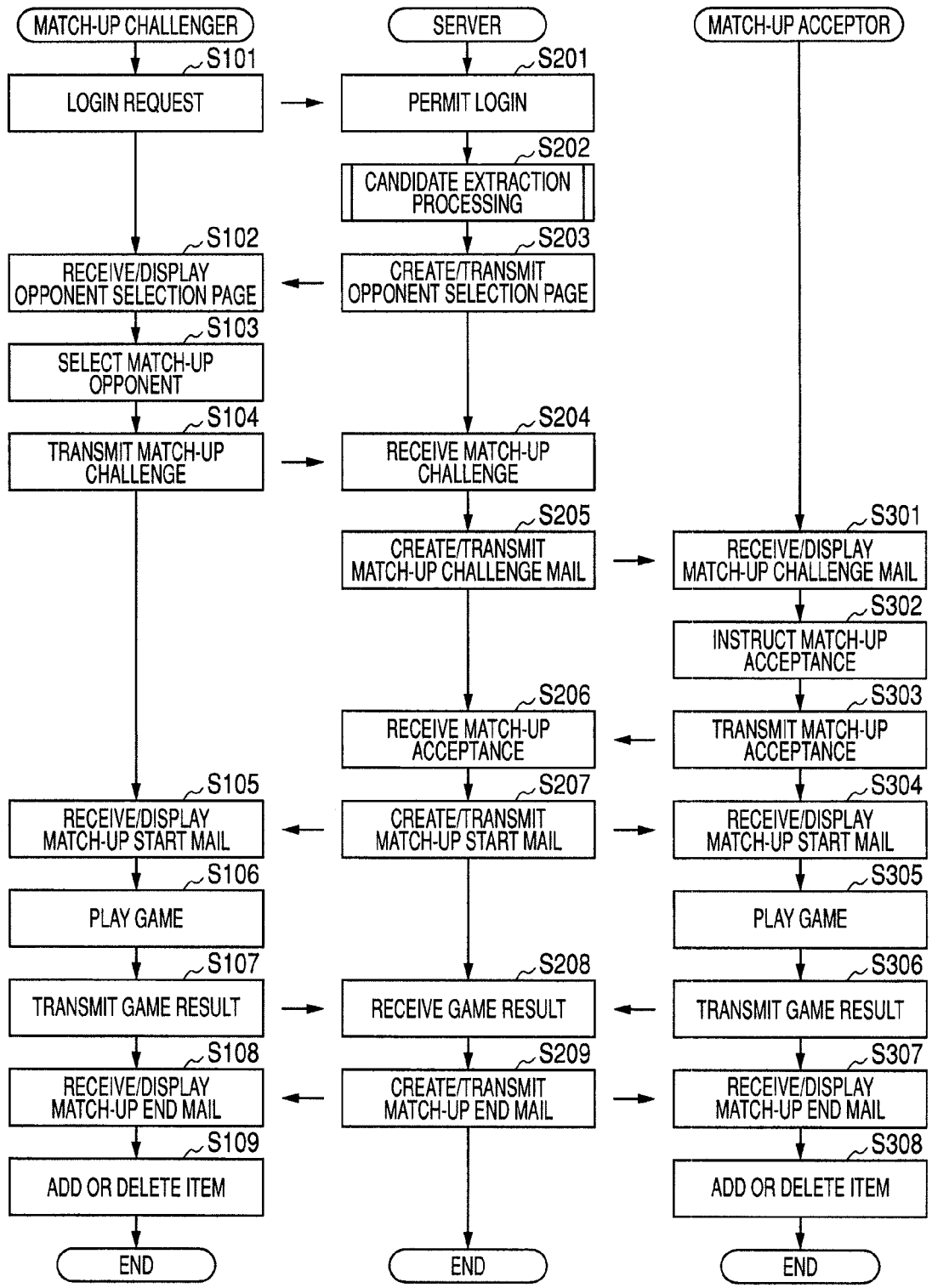
FIG. 5 is a flowchart illustrating a flow in a network system according to an embodiment of the invention until a plurality of mobile phone users complete a match-up in a game.

FIG. 5 is a flowchart showing processings to be executed by the mobile phone 1 of the match-up challenger, the mobile phone 1 of the match-up acceptor, and the server apparatus 200 in the network system according to an embodiment of the invention from one mobile phone reads the opponent selection site, until the users of the plurality of mobile phones ends a match-up in the game.

First, if the mobile phone 1 of the match-up challenger accesses the server apparatus 200 and the login page of the opponent selection site is displayed on the display device 16, the match-up challenger inputs his/her user ID and password through the input device 15 and operates the input device 15 to assigns a kind of a game to challenge the user of another mobile phone 1 to a match-up. Then, the match-up challenger operates the input device 15 to instruct login, and then the CPU 11 causes a login request to be transmitted from the communication device 18 to the server apparatus 200 through the network 3 (Step S101).

In the server apparatus 200, if the login request transmitted from the mobile phone 1 of the match-up challenger is received by the communication interface 215, the controller 203 determines whether or not a set of user ID and password in the login request is consistent with a set of user ID 301 and password 302 registered in the user information table 300, and if both are consistent with each other, permits login of the mobile phone 1 of the match-up challenger (Step S201). Moreover, when the sets of user ID and password are inconsistent with each other, authentication failure is informed, and the processing ends in that state.

If login of the mobile phone 1 of the match-up challenger is permitted, the controller 203 of the server apparatus 200 performs a candidate extraction processing, the details of which are described below, and extracts a user, who is liable to play a match in the game of the kind assigned by the match-up challenger, as the match-up opponent candidate (Step S202). The controller 203 creates an individual page of the opponent selection site according to each of the match-up opponent candidates extracted by the candidate extraction processing, and causes the created page to be transmitted from the communication interface 215 to the mobile phone 1 of the match-up challenger through the network 3 (Step S203).

In the mobile phone 1 of the match-up challenger, if the page of the opponent selection site transmitted from the server apparatus 200 is received by the communication device 18, the CPU 11 displays the received page on the display device 16 (Step S102). The match-up challenger operates the input device 15 to select any one match-up opponent candidate according to the opponent selection site displayed by the display device 16, and instructs the confirmation of the selection (Step S103). If the selection of the match-up opponent candidate is confirmed, the CPU 11 causes a match-up challenge request indicating information of the selected match-up opponent candidate to be transmitted from the communication device 18 to the server apparatus 200 through the network 3 (Step S104).

In the server apparatus 200, when the match-up challenge request transmitted from the mobile phone 1 of the match-up challenger is received by the communication interface 215 (Step S204), the controller 203 creates a match-up challenge mail indicating the match-up challenger and the game kind with the mail address 303 of the user as the match-up opponent candidate indicated by the match-up challenge request as a destination mail address, and sends the created match-up challenge mail from the communication interface 215 to the network 3 (Step S205).

In the mobile phone 1 of the match-up acceptor (though it is not confirmed to accept the match-up challenge yet at this time), the match-up challenge mail transmitted from the server apparatus 200 is immediately received by the communication device 18 insofar as it can exchange signals with a base station, and the CPU 11 displays the match-up challenge mail on the display device 16 (the match-up challenge mail may be displayed by a predetermined input from the input device 15) (Step S301).

The match-up acceptor (though it is not confirmed to accept the match-up challenge yet at this time) operates the input device 15 according to the match-up challenge mail displayed on the display device 16, and instructs acceptance of the match-up in the game from the match-up challenger indicated by the match-up challenge mail (Step S302). If the acceptance of the match-up is instructed, the CPU 11 causes a match-up acceptance request indicating the accepted match-up to be transmitted from the communication device 18 to the server apparatus 200 through the network 3 (Step S303).

In the server apparatus 200, when the match-up acceptance request transmitted from the mobile phone 1 of the match-up acceptor is received by the communication interface 215 (Step S206), the controller 203 creates a match-up start mail, which indicates the start of a match-up in the game indicated by the match-up acceptance request and the end time of the game, with the mail addresses 303 of a user, the match-up challenger, and a user, the match-up acceptor, as destination mail addresses, and sends the created match-up start mail from the communication interface 215 to the network 3. In regards to the match-up start mail, a match-up start mail for the match-up challenger and a match-up start mail for the match-up acceptor may be separately created and sent to the network (Step S207).

When the match-up acceptance request is not sent even if a predetermined time elapses after the match-up challenge mail is transmitted from the server apparatus 200, it is considered that the mobile phone 1 of the match-up acceptor (though it is not confirmed to accept the match-up challenge yet at this time) cannot receive a mail, or the match-up acceptor is doing something else and cannot start a match-up in the game. Then, match-up acceptance is closed within the predetermined time after the match-up challenge mail is transmitted from the server apparatus 200. In this case, the controller 203 may send a mail purporting unacceptance of the match-up with the mail address 303 of the match-up challenger as a destination from the communication device 18 to the network 3.

In each of the mobile phone 1 of the match-up challenger and the mobile phone 1 of the match-up acceptor, the match-up start mail sent from the server apparatus 200 is immediately received by the communication device 18 insofar as it can exchange a signal with the base station. Then, the CPU 11 displays the match-up start mail on the display device 16 (the match-up start mail may be displayed according to a predetermined input from the input device 15) (Steps S105 and S304).

In each of the mobile phone 1 of the match-up challenger and the mobile phone 1 of the match-up acceptor, if a predetermined input is made from the input device 15 according to the match-up start mail displayed on the display device 16, the CPU 11 starts a game to play the corresponding match-up. The game may be repeatedly executed and interrupted until the end time assigned by the match-up start mail reaches. In addition, in case of a racing game in a time trial mode, the game may be executed many times until the end time assigned by the match-up start mail reaches (Steps S106 and S305).

When the end time assigned by the match-up start mail reaches, the CPU 11 of each of the mobile phone 1 of the match-up challenger and the mobile phone 1 of the match-up acceptor causes the game result including a score, which is obtained by each user up to the end time, to be transmitted from communication device 18 to the server apparatus 200 through the network 3. It is assumed that the game result to be transmitted includes information, which, when the user of each mobile phone 1 loses the match-up, assigns an item to take away from the corresponding user. In addition, in case of a game that is executed many times up to the end time assigned by the match-up start mail, the score obtained by each user may be the highest score among the scores (Steps S107 and S306).

In the server apparatus 200, if the game result from the mobile phone 1 of the match-up challenger and the game result from the mobile phone 1 of the match-up acceptor are received by the communication interface 215 (Step S208), the controller 203 creates a match-up end mail with the mail addresses 303 of the user, the match-up challenger, and the user, as the match-up acceptor as destination mail addresses for each of the match-up challenger and the match-up acceptor, and sends the created match-up end mail from the communication interface 215 to the network 3. The match-up end mail includes, as information, an item that is acquired by a user who won a match-up in the game and an item that is taken away from a user who lost the match-up in the game (Step S209). If the match-up end mail is sent, the processing in the server apparatus 200 ends.

In each of the mobile phone 1 of the match-up challenger and the mobile phone 1 of the match-up acceptor, the match-up end mail sent from the server apparatus 200 is immediately received by the communication device 18 insofar as it can exchange a signal with the base station. Then, the CPU 11 displays the match-up end mail on the display device 16 (the match-up end mail may be displayed according to a predetermined input from the input device 15) (Steps S108 and S307).

In each of the mobile phone 1 of the match-up challenger and the mobile phone 1 of the match-up acceptor, if a predetermined input is made from the input device 15 according to the match-up end mail displayed on the display device 16, under the control of the CPU 11, a user acquires or loses a game item, which is managed by the RAM 13 or the flash memory 14 according to the match-up end mail (Steps S109 and S308). Then, the processing in each of the mobile phone 1 of the match-up challenger and the mobile phone 1 of the match-up acceptor ends.

Next, the candidate extraction processing at Step S202 will be described in detail. FIG. 6 is a flowchart specifically showing the candidate extraction processing at Step S202. During the candidate extraction processing, the controller 203 sequentially performs a loop processing on all of the users, who are logging on, excluding the user of the mobile phone 1 (that is, the match-up challenger) (Steps S401 to S401').

During the loop processing, the controller 203 determines whether or not a user subject to the processing has played a match-up in the game of the kind assigned by the login request from the user subject to the processing with other users including the mach-up challenger with reference to the records 306a to 306d registered in the user information table 300 as the utilization history 306 (Step S402). If the user subject to the processing did not play a match-up in the game of the corresponding kind, the process progresses to Step S406. If the user subject to the processing has played the game of the corresponding kind, the controller 203 adds α (constant) to the score of the goodness of fit for the corresponding user (Step S403).

In addition, the controller 203 determines whether or not the user subject to the processing has obtained a high score in the game of the corresponding kind with reference to the game kind 312 and the high score flag 315 among the records 306a to 306d for the user subject to the processing (Step S404). If the user subject to the processing has obtained the high score in the game of the corresponding kind, the controller 203 adds β (constant) to the score of the goodness of fit for the corresponding user (Step S405). Then, the process progresses to Step S406. If the user subject to the processing has not obtained the high score in the game of the corresponding kind, the process progresses Step S406 without passing through Step S405.

At Step S406, the controller 203 determines whether or not the user subject to the processing has challenged someone to a match-up in the game of the corresponding kind with reference to the challenge/acceptance kind 311 and the game kind 312 among the records 306a to 306d for the user subject to the processing. If the user subject to the processing has challenged to a match-up in the game of the corresponding kind, the controller 203 adds γ (constant) to the score of the goodness of fit for the corresponding user (Step S407). Then, the process progresses to Step S408. If the user subject to the processing did not challenge to the match-up in the game of the corresponding kind, the process progresses to Step S408 without passing through Step S407.

At Step S408, the controller 203 determines whether or not the user subject to the processing has played a match-up with the match-up challenger in the past, regardless of the kind of the game, with reference to the match-up opponent 313 among the records 306a to 306d for the user subject to the processing. If the user subject to the processing has played a match-up with the match-up challenger in the past, the controller 203 adds δ (constant) to the score of the goodness of fit for the corresponding user (Step S409). Subsequently, the process progresses to Step S410. If the user subject to the processing has not played a match-up with the match-up challenger in the past, the process progresses to Step S410 without passing through Step S409.

At Step S410, the controller 203 adds, to the score of the goodness of fit for the corresponding user, a value according to the time elapsed from the last login date-and-time 304 registered in the user information table 300 for the user subject to the processing to the current time. For example, if the time elapsed from the last login date-and-time 304 is within 24 hours (including a case where the corresponding mobile phone is logging on to the opponent selection site at present), $\epsilon 1$ is added to the score of the goodness of fit. If the time elapsed is within 48 hours, $\epsilon 2$ is added, and if the time elapsed within one week, $\epsilon 3$ is added. Here, $\epsilon 1$ to $\epsilon 3$ are constants, and the condition $\epsilon 1 > \epsilon 2 > \epsilon 3$ is satisfied.

Next, the controller 203 determines whether or not all of the users excluding the match-up challenger are subjected to the loop processing, and if all of the users are subjected to the processing, goes off from the loop processing. If going off from the loop processing, the controller 203 extracts, as the match-up opponent candidates, a predetermined number of users among the users who are logging on the opponent selection site at present (users whose last login date-and-time 304 is registered in the user information table 300, but whose last logout date-and-time 305 is not registered) in a descending order of the score of the goodness of fit (Step S411).

Then, the controller 203 determines whether or not the predetermined number of match-up opponent candidates are extracted among the users who are logging on at present (Step S412). If the predetermined number of match-up opponent candidates could not be extracted among the users who are logging on at present, the controller 203 extracts, as the match-up opponent candidates, remaining users among users, who are not logging on at present, in a descending order of the score of the goodness of fit until the predetermined number of match-up opponent candidates are extracted (Step S413). Subsequently, the candidate extraction processing ends, and the process returns to the flowchart of FIG. 5. If the predetermined number of match-up opponent candidates could be extracted among the users who are logging on at present, the candidate extraction processing ends without passing through Step S413, the process returns to the flowchart of FIG. 5.

As described above, in the network system according to this embodiment, the server apparatus 200 stores and manages the user information table 300, in which the last login date-and-time 304, the last logout date-and-time 305, and the utilization history 306 are registered for each user, in the storage device, in addition to the user ID 301, the password 302, and the mail address 303. When the user of a mobile phone 1 wants to play a match-up with someone in a game, he/she assigns the kind of game and logs on to the opponent selection site with the mobile phone 1. Accordingly, the login request is sent from the mobile phone 1 of the corresponding user, and then the controller 203 of the server apparatus 200 calculates the score of the goodness of fit for each user with reference to the user information table, extracts the opponent candidates according to the calculated score of the goodness of fit, and individually creates the page of the opponent selection site.

In extracting the opponent candidate, $\alpha$ is added to the score of the goodness of fit of a user who has played a match-up in the game of the kind assigned by the login request. The users of the plurality of mobile phones 1 prefer different games, but a user who has played a match-up in a game of a kind usually prefers the game of the corresponding kind. Accordingly, if a challenge to a match-up in the game of the corresponding kind is made, a user who is challenged to the match-up is liable to accept the challenge. For such a user, the score of the goodness of fit is calculated high. Therefore, a user who is liable to accept the match-up challenge is preferentially extracted as the opponent candidate.

In addition, $\gamma$ is added to the score of the goodness of fit of a user who has challenged to a match-up in the game of the kind assigned by the login request in the past. A user who has challenged to a match-up in a game of a kind usually prefers the game of the corresponding kind. Accordingly, if a user is challenged to a match-up in the game of the corresponding kind, the user is liable to accept the match-up. For such a user, the score of the goodness of fit is calculated high. Therefore, another user who is liable to accept a match-up challenge is preferentially extracted as the opponent candidate.

Furthermore, $\delta$ is added to the score of the goodness of fit of a user who has played a match-up with the user of the mobile phone 1, which transmits the login request, in the past. The user of each mobile phone 1 usually wants to play a match-up with another user with whom the user has played a match-up in the past. Such a user is liable to accept a match-up challenge from another user (generally, a predetermined number of users exist) with whom the user has played a match-up in the past more than another user with whom the user did not play a match-up in the past (generally, an enormous number of users exist). For such a user, the score of the goodness of fit is calculated high. Therefore, another user who is liable to accept a match-up challenge is preferentially extracted as the opponent candidate.

Furthermore, $\beta$ is added to the score of the goodness of fit of a user who has obtained a high score in the game of the kind assigned by the login request. A user who plays a game is motivated to continuously play a game of a kind in which a high score is marked. For example, if a high score is rewritten by another user, the user usually wants to rewrite a high score. As such, a user who marks a high score in a game of a kind is highly motivated to play the game of that kind, and if another user challenges him/her to a match-up, he/she is liable to accept the match-up. For such a user, the score of the goodness of fit is calculated high. Therefore, another user who is liable to accept a match-up challenge is preferentially extracted as the opponent candidate.

Furthermore, the value according to the time elapsed from the last login date-and-time 304 (the shorter the time elapsed is, the higher the value is) is added to the score of the goodness of fit. The user of a mobile phone 1 that comparatively lastly logs on to the opponent selection site wants to play a game more strongly than the user of a mobile phone 1 that does not log on, and if another user challenges him/her to a match-up, he/she is liable to accept the match-up challenge. For such a user, the score of the goodness of fit is calculated high. Therefore, another user who is liable to accept a match-up challenge is preferentially extracted as the opponent candidate.

As the opponent candidates that are listed on the opponent selection site, a predetermined number of opponent candidates are extracted, but users who are logging on at present are preferentially extracted until the predetermined number of opponent candidates are extracted. The user who is logging on at present usually wants to positively play a match-up in the game, and if another user challenges him/her to a match-up, he/she is liable to accept the match-up challenge. Such a user is first extracted as the opponent candidate. Therefore, another user who is highly liable to accept a match-up challenge is preferentially extracted as the opponent candidate.

As such, if the user of a mobile phone 1 that logs on challenges to a match-up, anyone of the opponent candidates that are listed on the opponent selection site is liable to accept the match-up challenge. For this reason, a user needs to select one opponent candidate according to the opponent selection page and challenge him/her to a match-up in the game. However, even if any opponent candidate is selected, the opponent candidate is liable to accept the match-up in the game.

If the match-up challenge request indicating the selected opponent candidate is transmitted to the server apparatus 200, the match-up challenge mail is sent with the mail address 303 of the user as the selected opponent candidate as a destination. The match-up challenge mail is a text message on the mobile phone. Accordingly, if the match-up challenge mail is sent from the server apparatus 200, it is liable to be immediately received by the mobile phone 1 of the user as the selected opponent candidate. If the mail is incoming to the mobile phone 1, an incoming mail tone is output from the speaker 17. Accordingly, the user as the opponent candidate selected on the opponent selection site immediately awakes that he/she is challenged to a match-up in a game.

The user of a mobile phone 1 that receives the match-up challenge mail is listed on the opponent selection site as the opponent candidate to begin with. Accordingly, he/she is liable to accept a match-up challenge in a game by the match-up challenge mail. And, it is liable to start a match-up between a match-up challenger (a user who selects an opponent candidate on the opponent selection page) and a match-up acceptor (a user who accepts a match-up of the match-up challenge mail). Therefore, a user who wants to play a match-up with another user in the game can easily find the user of another mobile phone 1 who can immediately play a match-up in the game.

For a user who wants to play a match-up with another user in a game, what are presented on the opponent selection site, which is provided by the server apparatus 200 are just the opponent candidates, and thus the user decides another user to challenge to a match-up in the game among the opponent candidates. For this reason, for example, when a user who wants to play a match-up with another user in the game desires that he/she wants to play a match-up with another user who has played a match-up with him/her in the past or he/she wants to play a match-up with another user who has not played a match-up with him/her in the past, the user can find an opponent in a game according to his/her desires.

If the match-up acceptance request is transmitted from the mobile phone 1 of the match-up acceptor in regards to the match-up challenge mail sent from the server apparatus 200, the match-up start mail is transmitted to both the mobile phone 1 of the match-up challenger and the mobile phone 1 of the match-up acceptor, and accordingly, the match-up in the game starts. Meanwhile, in receiving the match-up acceptance request, there is a limit that it must be received within a predetermined time after the match-up challenge mail is sent. The user of the mobile phone 1 that receives the match-up challenge mail is surely liable to accept a match-up in the game indicated by the match-up challenge mail, but he/she may not necessarily accept the match-up. In addition, the match-up challenge mail may not be received since the mobile phone 1 is turned off or is out of a range where an electric wave reaches, or the user of the mobile phone 1 that receives the match-up challenge mail may not immediately play a match-up in the game since he/she is doing something else.

If the match-up challenger waits until the match-up start mail is sent after he/she challenges to a match-up in the game, a time may elapse while the match-up challenger who wants to play a match-up in the game does not play a match-up in the game. In addition, even if the time elapsed is extended, possibility to accept a match-up is not always increased. Accordingly, if a time within which a user who is challenged to a match-up in the game must accept is set, a user who wants to play a match-up with another user in a game can have a chance to find an additional user to play a match-up in the game.

When the end time assigned by the match-up start mail reaches after the mobile phone 1 of the match-up challenger and the mobile phone 1 of the match-up acceptor starts the game, the game result (for example, a score obtained up to that time or a high score among the game is executed any times up to that time) is transmitted to the server apparatus 200. Then, the match-up end mail is transmitted from the server apparatus 200 to both the mobile phone 1 of the match-up challenger and the mobile phone 1 of the match-up acceptor. If the match-up end mail is received, the match-up between the match-up challenger and the match-up acceptor in the game completely ends.

As such, at the assigned end time of the game, the game result is transmitted from each mobile phone 1 to the server apparatus 200. For this reason, a game in which the match-up challenger and the match-up acceptor play a match-up may not be a game in which the users necessarily play a match-up simultaneously. For example, a stand-alone type game may be used. Accordingly, each of the match-up challenger and the match-up acceptor can play a game for a match-up according to his/her pace. In addition, for example, a game that is bundled with the mobile phone 1 and is originally played by a user alone may be effectively used for a match-up between a plurality of users.

When the game results are transmitted from the mobile phone 1 of the match-up challenger and the mobile phone 1 of the match-up acceptor to the server apparatus 200, an item that is taken away from a user who lost a match-up is assigned, and this item is given by the match-up end mail to a user who won the match-up. As such, since a user acquires or lost an item according to the match-up result in the game, the user increasingly feels an interest in playing a match-up in the game. In addition, since a new item is given to a user who won the match-up, a user is motivated to play a match-up with another user in the game.

The invention is not limited to the foregoing embodiment, but various modifications and applications may be made. Hereinafter, modifications of the foregoing embodiment that may be applied to the invention will be described.

In the foregoing embodiment, a predetermined number of opponent candidates are defined to be listed on the opponent selection site, and users who are logging on are preferentially extracted. In addition, if the number of users who are logging on exceeds the predetermined number, users who are not logging on are not extracted as the opponent candidates. Alternatively, for the users who are logging on, a high value (for example, $\epsilon 0$: $\epsilon 0 > \epsilon 1$) may be added to the score of the goodness of fit according to the time elapsed from the last login date-and-time 304. Then, as the opponent candidates, a predetermined of users may be extracted in a descending order of the score of the goodness of fit, regardless of whether or not they are logging on.

In addition, a value according to the time elapsed from the last logout date-and-time 305, instead of the last login date-and-time 304 of each user, may be added to the score of the goodness of fit. It is considered that a user whose last logout date-and-time 305 is not registered is logging on. Accordingly, for such a user, a higher value may be added to the score of the goodness of fit than that for a user whose last logout date-and-time 305 is registered.

For a user whose last login date-and-time 304 and/or the last login date-and-time 305 includes a time, which is in the same time zone as the current time (for example, within one hour before and after the current time), a predetermined value may be added to the score of the goodness of fit. In regards to a user who logged on before in the same time zone as the current time, in view of his/her life pattern, even if he/she is not logging on, he/she may be liable to play a match-up in the game at present. That is, if another user challenges him/her to a match-up in the game, he/she may be liable to accept the match-up challenge.

In the foregoing embodiment, for another user who has played a match-up with the user of the mobile phone 1 that transmits the login request or another user who has played a match-up in the game of the kind assigned by the login request, the score of the goodness of fit is added. Alternatively, with reference to the records 306a to 306d of the utilization history 306 of each user registered in the user information table 300, the score of the goodness of fit of each user may be added according to how many times he/she has played a match-up with the user of the mobile phone 1, which transmits the login request. In addition, the score of the goodness of fit of each user may be added according to how many times he/she has played a match-up in the game of the kind assigned by the login request. Furthermore, the score of the goodness of fit of each user may be added according to how many times he/she has played a match-up in the game or how many times he/she challenges to a match-up in the game (that is, the number of records 306a to 306d in the utilization history 306), regardless of with whom he/she has played a match-up or in which kind of game he/she has played a match-up.

A user who is playing a match-up with other users in the game many times usually prefers to play a match-up in the game more than a user who few plays a match-up with other users. In addition, a user who is playing a match-up with a specific user in the game many times usually prefers to play a match-up with the specific user more than a user who few plays (or does not play) a match-up with the specific user. Furthermore, a user who is playing a match-up in a game of a specific kind many times usually prefers to play a match-up in the game of the specific kind more than a user who few plays (or does not play) a match-up in the game of the specific kind. That is, such a user is highly liable to accept the match-up challenge.

Accordingly, the score of the goodness of fit is added according to how many times a user has played a match-up with the user of the mobile phone 1, which transmits the login request, how many times a user has played a match-up in the game of the kind assigned by the login request, or how many times each user has played a match-up in the game or how many times each user challenges to a match-up in the game, and those users are preferentially extracted as the opponent candidates. Therefore, a user who wants to play a match-up with another user in the game (of the specific kind) can easily find the user of another mobile phone 1 who can immediately play a match-up with him/her in the game.

In the foregoing embodiment, for a user who has obtained a high score in the game of the kind assigned by the login request, β is added to the score of the goodness of fit. This is to motivate the user, who has obtained the high score, to play the game again. However, even if a user has not obtained a high score, when he/she obtains a predetermined record or more (for example, top ranking or a predetermined score or more), he/she may be similarly motivated. Accordingly, for a user who obtains a predetermined record or more, not a high score, in the game of the kind assigned by the login request, a predetermined value (preferably, less than β) may be added to the score of the goodness of fit.

In the foregoing embodiment, when the opponent candidates to be listed on the opponent selection site are extracted, for a user who is liable to accept the match-up challenge, the score of the goodness of fit is set high. In this case, however, the ability of the user in the game is not taken into consideration. Alternatively, the score when the match-up in the game was played may be registered in the records 306a to 306d of the utilization history 306. Then, for a user who obtains a score similar to a score obtained by the user of the mobile phone 1, which transmits the login request, in the game of the kind assigned by the login request, a predetermined value may be added to the score of the goodness of fit.

Furthermore, personal information, such as a profile, for each user may be registered in the user information table 300, and a predetermined value may be added to the score of the goodness of fit of each user according to the similarity of the registered personal information. Accordingly, a user who wants to play a match-up with another user in the game can easily find the user of another mobile phone 1 who can immediately play a match-up in the game, and can also find another user as a match-up opponent in the game for the corresponding user.

In the foregoing embodiment, as a game for a match-up between the users, a stand-along type game in which the users do not need to play a match-up simultaneously is exemplified. Accordingly, when the assigned end time reaches, the game results are transmitted from the mobile phone 1 of the match-up challenger and the mobile phone 1 of the match-up acceptor to the server apparatus 200. Alternatively, a game for a match-up between the users may be an online game (including an online match-up game) which allows the mobile phones 1 to access the server apparatus 200 and to play a game simultaneously.

In this case, while the game starts and ends, information for playing a game is transmitted from both the mobile phone 1 of the match-up challenger and the mobile phone 1 of the match-up acceptor as occasion demands. The game results are generated according to the information transmitted from both the mobile phones 1 until the game ends. This is the same as a case where information indicating the game result on the basis of information finally transmitted to the server apparatus 200 when the game ends is transmitted to the server apparatus 200. Alternatively, the information indicating the final game result may be transmitted from both the mobile phone 1 of the match-up challenger and the mobile phone 1 of the match-up acceptor to the server apparatus 200, separately from the information to be occasionally transmitted to play the game.

In the foregoing embodiment, on the opponent selection site, a page is individually created each time the login request is transmitted from each of the plurality of mobile phones 1. The individual contents are just a different in the opponent candidates to be listed. A change in direction is not taken into consideration. Alternatively, for example, a direction according to whether or not the user of the mobile phone 1, which transmits the login request, easily find another user to play a match-up in the game may be introduced into the opponent selection site, which is individually created.

For example, according to the number of users who are logging on, a direction, such as an arrow with a letter hit on the opponent selection site or a flying arrow with a letter, may be performed. In addition, when an entrance door is provided on the opponent selection site, a grand door may be provided or the number of shoes that are arranged in front of the door may be changed according to the number of users who are logging on. These directions may be performed according to the number of users, who are logging on, while the game of the same kind is assigned. Alternatively, these directions may be performed according to the scores of the goodness of fit of the users who are extracted as the opponent candidates.

In the above-described embodiment, the program and data that are used in the server apparatus 200 are stored in the recording medium 231 and distributed. Meanwhile, the program and data may be stored in a fixed disc device of another server apparatus on the network 3, and distributed to the server main body 201 through the network 3. In the server apparatus 200, the program and data that are received by the communication interface 215 from the server apparatus may be stored in the HDD 207 and loaded to the RAM 205 when the game is executed.

What is claimed is:

1. A server apparatus that is connected to a plurality of mobile phones having a function to execute a game through a network including a mobile phone network, the server apparatus comprising:
   a user information storage that, for each user of the plurality of mobile phones, stores utilization information indicating other users of the plurality of mobile phones that have one of played and tried to play the game with the user;
   a selection request receiver that receives a selection request for selecting an opponent to play a match-up in the game from one of the plurality of mobile phones through the network, the one of the plurality of mobile phones from which the selection request is received being a match-up challenger mobile phone used by a challenger user;
   a candidate extractor that, in response to the selection request being received by the selection request receiver from the match-up challenger mobile phone, extracts opponent candidates, who are liable to immediately play the match-up in the game, among the other users of the plurality of mobile phones according to the utilization information of the challenger user stored in the user information storage;
   a list transmitter that transmits a candidate list, on which the opponent candidates extracted by the candidate extractor are listed, to the match-up challenger mobile phone through the network;
   a selected opponent information receiver that receives, from the match-up challenger mobile phone, opponent information about an opponent user selected from the candidate list transmitted by the list transmitter;
   a match-up challenge mail transmitter that transmits, to a match-up opponent mobile phone of the opponent user corresponding to the opponent information received by the selected opponent information receiver through the network, a match-up challenge mail, which indicates a match-up challenge from the challenger user of the match-up challenger mobile phone;
   a match-up acceptance information receiver that receives, from the match-up opponent mobile phone, which accepts the match-up challenge of the match-up challenge mail, acceptance information about acceptance of the match-up challenge in regards to the match-up challenge mail transmitted from the match-up challenge mail transmitter; and
   a match-up start mail transmitter that, when the match-up acceptance information receiver receives the acceptance information about the acceptance of the match-up challenge, transmits a match-up start mail, which instructs to start the match-up in the game, to both the match-up challenger mobile phone and the match-up opponent mobile phone through the network.

2. The server apparatus according to claim 1, further comprising:
   a game result receiver that receives result information about a result of the match-up in the game, which starts according to the match-up start mail transmitted from the match-up start mail transmitter, from the match-up challenger mobile phone and the match-up opponent mobile phone through the network; and
   a match-up end mail transmitter that, when the game result receiver receives the result information about the result of the match-up in the game from both the match-up challenger mobile phone and the match-up opponent mobile phone, transmits a match-up end mail purporting an end of the match-up in the game to both the match-up challenger mobile phone and the match-up opponent mobile phone through the network.

3. The server apparatus according to claim 2, wherein the match-up in the game, which is executed on the match-up challenger mobile phone and the match-up opponent mobile phone according to the match-up start mail, is a stand-alone type game, and a score until a predetermined time elapses after the match-up in the game starts is the result of the match-up in the game.

4. The server apparatus according to claim 3, wherein the match-up end mail includes incentive information that grants a predetermined incentive to at least one of the challenger user of the match-up challenger mobile phone and the opponent user of the match-up opponent mobile phone according to the match-up result of the match-up in the game.

5. The server apparatus according to claim 2, wherein the match-up end mail includes incentive information that grants a predetermined incentive to at least one of the challenger user of the match-up challenger mobile phone and the opponent user of the match-up opponent mobile phone according to the match-up result of the match-up in the game.

6. The server apparatus according to claim 1, wherein the user information storage stores, as the utilization information, login/logout information about a time at which each of the plurality of mobile phones lastly at least one of logs on to and logs out of the server apparatus, and
   the candidate extractor preferentially extracts, as at least one of the opponent candidates, one of the users who most lastly at least one of logs on to and logs out of the server apparatus.

7. The server apparatus according to claim 6, wherein the login/logout information specifies one of the plurality of mobile phones which is currently logging on to the server apparatus, and
   the candidate extractor most preferentially extracts, as at least one of the opponent candidates, the one of the users of the one of the plurality of mobile phones that is currently logging on to the server apparatus.

8. The server apparatus according to claim 1, wherein the user information storage stores, for each user of the plurality of mobile phones, match-up history information, which specifies the other users with whom the user has played the game, as the utilization information, and
   the candidate extractor preferentially extracts the other users, with whom the challenger user of the match-up challenger mobile phone has played the game, as the opponent candidates.

9. The server apparatus according to claim 1, wherein a plurality of kinds of games are executed by the plurality of mobile phones, with each of the plurality of mobile phones executing at least one of the plurality of kinds of games,
   the selection request specifies one of the plurality of kinds of games,
   the user information storage stores, for each user of the plurality of mobile phones, game kind information about ones of the plurality of kinds of games in which the user has played with the other users, and
   the candidate extractor preferentially extracts the other users, with whom the challenger user has played the one of the plurality of kinds of games specified by the selection request receiver, as the opponent candidates.

10. The server apparatus according to claim 9,
wherein the user information storage stores, for each user, the game kind information about the one of the plurality of kinds of games specified by the selection request, and
the candidate extractor preferentially extracts the other users who made a selection request, which specifies the one of the plurality of kinds of games specified by the selection request, as the opponent candidates.

11. The server apparatus according to claim 1,
wherein the user information storage stores, for each user of the plurality of mobile phones, hi-score information that specifies whether each the user has obtained at least a predetermined score in the game, and
the candidate extractor preferentially extracts the other users, who have obtained at least the predetermined score in the game, as the opponent candidates.

12. The server apparatus according to claim 1,
wherein the user information storage stores information that specifies how many times each user plays the game with the other users, and
the candidate extractor preferentially extracts the other users, who have played the game at least a predetermined number of times, as the opponent candidates.

13. The server apparatus according to claim 1,
wherein, when the acceptance information is received within a predetermined time after the match-up challenge mail is transmitted, the match-up start mail transmitter transmits the match-up start mail to both the match-up challenger mobile phone and the match-up opponent mobile phone.

14. An opponent selection system, comprising:
a plurality of mobile phones, each having a game execution function for executing a game; and
a server apparatus that is connected to the plurality of mobile phones through a network including a mobile phone network,
wherein a challenger user of a match-up challenger mobile phone among the plurality of mobile phones selects an opponent user of a match-up opponent mobile phone among the plurality of mobile phones as an opponent with whom the challenger user plays a match-up in the game,
the match-up challenger mobile phone includes:
  a selection request transmitter that transmits a selection request for selecting the opponent user of the match-up opponent mobile phone connected to the server apparatus as the opponent of the match-up in the game to the server apparatus through the network;
  a candidate list receiver that, in response to the selection request from the selection request transmitter, receives a candidate list, on which opponent candidates transmitted from the server apparatus are listed;
  a list display that displays the candidate list received by the candidate list receiver;
  a candidate selector that selects the opponent user from among the opponent candidates to challenge to the match-up in the game on the candidate list displayed by the list display according to a first operation of the challenger user;
  a match-up challenge transmitter that transmits match-up challenge information indicating the opponent user selected by the candidate selector to the server apparatus through the network;
  a match-up start mail receiver that, when the opponent user accepts a match-up challenge of a match-up challenge mail, receives a match-up start mail from the server apparatus; and
  a game starter that starts the match-up in the game according to the match-up start mail received by the match-up start mail receiver,
the server apparatus includes:
  a user information storage that, for each user of the plurality of mobile phones, stores utilization information indicating other users of the plurality of mobile phones that have one of played and tried to play the game with the user;
  a selection request receiver that receives the selection request transmitted from the selection request receiver;
  a candidate extractor that, in response to the selection request being received by the selection request receiver, extracts the opponent candidates, who are able to play the challenger user of the match-up challenger mobile phone in the match-up in the game, among the other users of the plurality of mobile phones according to the utilization information of the challenger user stored in the user information storage;
  a list transmitter that transmits the candidate list, on which the opponent candidates extracted by the candidate extractor are listed, to the match-up challenger mobile phone through the network;
  a match-up challenge information receiver that receives the match-up challenge information transmitted from the match-up challenge transmitter;
  a match-up challenge mail transmitter that transmits the match-up challenge mail, which indicates the match-up challenge from the challenger user of the match-up challenger mobile user, to the match-up opponent mobile phone of the opponent user, which corresponds to the match-up challenge information received by the match-up challenge information receiver, through the network;
  a match-up acceptance information receiver that, from the match-up opponent mobile phone of the opponent user who accepts the match-up challenge of the match-up challenge mail, receives acceptance information about the acceptance of the match-up challenge in regards to the match-up challenge mail transmitted from the match-up challenge mail transmitter; and
  a match-up start mail transmitter that, when the match-up acceptance information receiver receives the acceptance information about the acceptance of the match-up challenge, transmits the match-up start mail, which instructs to start the match-up in the game, to both the match-up challenger mobile phone and the match-up opponent mobile phone, which transmits the acceptance information about the acceptance of the match-up challenge through the network,
the match-up opponent mobile phone of the opponent user indicated by the match-up challenge information includes:
  a match-up challenge mail receiver that receives the match-up challenge mail transmitted from the match-up challenge mail transmitter;
  a match-up challenge mail display that displays the match-up challenge mail received by the match-up challenge mail receiver;
  a match-up acceptance instructor that instructs to accept the match-up challenge of the match-up challenge mail displayed by the match-up challenge mail display according to a second operation of the opponent user;

a match-up acceptance information transmitter that, when the match-up acceptance instructor instructs to accept the match-up challenge, transmits the acceptance information about the acceptance of the match-up of the match-up challenge mail to the server apparatus through the network, and causes the match-up acceptance information receiver to receive the acceptance information;

a match-up start mail receiver that receives the match-up start mail transmitted from the match-up start mail transmitter; and a game starter that starts the game executor to execute the game according to the match-up start mail received by the match-up start mail receiver.

15. A mobile phone, comprising:

a network connection that performs connection to a network in a server apparatus;

a game executor that executes a game;

a selection request transmitter that transmits a selection request for selecting an opponent user of a match-up opponent mobile phone connected to the server apparatus as a match-up opponent in a match-up in the game to the server apparatus through the network;

a candidate list receiver that, in response to the selection request from the selection request transmitter, receives a candidate list, on which other users as opponent candidates transmitted from the server apparatus are listed;

a list display that displays the candidate list received by the candidate list receiver;

a candidate selector that selects the opponent user to challenge to the match-up in the game on the candidate list displayed by the list display according to a a first operation;

a match-up challenge transmitter that transmits a first instruction to transmit a match-up challenge mail to the match-up opponent mobile phone of the opponent user selected by the candidate selector to the server apparatus through the network;

a match-up challenge mail receiver that receives the match-up challenge mail transmitted from the server apparatus on the basis of a second instruction from the match-up opponent mobile phone of the opponent user;

a match-up challenge mail display that displays the match-up challenge mail received by the match-up challenge mail receiver;

a match-up acceptance instructor that instructs to accept the match-up challenge of the match-up challenge mail displayed by the match-up challenge mail display according to a second operation;

a match-up acceptance information transmitter that, when the match-up acceptance instructor instructs to accept the match-up challenge, transmits acceptance information about the acceptance of the match-up of the match-up challenge mail to the server apparatus through the network;

a match-up start mail receiver that receives a match-up start mail, which is transmitted from the server apparatus in response to one of the match-up challenge transmitter transmitting the match-up challenge mail and the match-up acceptance information transmitter transmitting the acceptance information about the acceptance of the match-up;

a game result transmitter that executes the match-up in the game according to the match-up start mail received by the match-up start mail receiver, and transmits the result of the match-up in the game, which started according to the match-up start mail, to the server apparatus through the network; and a match-up end mail receiver that receives a match-up end mail transmitted from the server apparatus according to the result of the game transmitted from the game result transmitter.

16. An opponent selection method that is executed on a computer apparatus, which is connected to a plurality of mobile phones having a function to execute a game through a network including a mobile phone network, the opponent selection method comprising:

for each user of the plurality of mobile phones, storing and managing, in a storage device provided in the computer apparatus, utilization information indicating other users of the plurality of mobile phones that have one of played and tried to play the game with the user;

causing a communication device provided in the computer apparatus to receive a selection request for selecting an opponent to play a match-up in the game transmitted from one of the plurality of mobile phones through the network, the one of the plurality of mobile phones from which the selection request is received being a match-up challenger mobile phone used by a challenger user;

in response to the received selection request, extracting opponent candidates, with whom the challenger user of the match-up challenger mobile phone, which transmits the selection request, plays the match-up in the game, among the other users of the plurality of mobile phones according to the utilization information of the challenger user managed by the storage device;

transmitting a candidate list, on which the opponent candidates extracted by the candidate extractor are listed, from the communication device to the match-up challenger mobile phone, which transmits the selection request, through the network;

causing the communication device to receive opponent information indicating an opponent user selected by the match-up challenger mobile phone, which receives the candidate list, according to the candidate list;

transmitting a match-up challenge mail, which indicates a match-up challenge from the challenger of the match-up challenger mobile phone, which selects the opponent user according to the candidate list, from the communication device to a match-up opponent mobile phone of the opponent user corresponding to the received opponent information through the network;

transmitting the match-up challenge mail and causing the communication device to receive acceptance information about the acceptance of the match-up challenge transmitted from the match-up opponent mobile phone, which accepts the match-up challenge of the match-up challenge mail; and when the acceptance information about the acceptance of the match-up challenge is received, transmitting a match-up start mail, which instructs to start the match-up in the game, from the communication device to both the match-up challenger mobile phone, which transmits the opponent information indicating the opponent user selected according to the candidate list, and the match-up opponent mobile phone, which transmits the acceptance information about the acceptance of the match-up challenge, through the network.

17. A non-transitory computer-readable medium including a program that is executed on a computer apparatus, which is connected to a plurality of mobile phones having a function to execute a game through a network including a mobile phone network, the program causes the computer apparatus to execute:

- for each user of the plurality of mobile phones, storing and managing, in a storage device provided in the computer apparatus, utilization information indicating other users of the plurality of mobile phones that have one of played and tried to play the game with the user;
- causing a communication device provided in the computer apparatus to receive a selection request for selecting an opponent to play a match-up in the game transmitted from one of the plurality of mobile phones through the network, the one of the plurality of mobile phones from which the selection request is received being a match-up challenger mobile phone used by a challenger user;
- in response to the received selection request, extracting opponent candidates, with whom the challenger user of the match-up challenger mobile phone, which transmits the selection request, plays the match-up in the game, among the other users of the plurality of mobile phones according to the utilization information of the challenger user managed by the storage device;
- transmitting a candidate list, on which the opponent candidates extracted by the candidate extractor are listed, from the communication device to the match-up challenger mobile phone, which transmits the selection request, through the network;
- causing the communication device to receive opponent information indicating an opponent user selected by the match-up challenger mobile phone, which receives the candidate list, according to the candidate list;
- transmitting a match-up challenge mail, which indicates a match-up challenge from the challenger of the match-up challenger mobile phone, which selects the opponent user according to the candidate list, from the communication device to a match-up opponent mobile phone of the opponent user corresponding to the received opponent information through the network;
- transmitting the match-up challenge mail and causing the communication device to receive acceptance information about the acceptance of the match-up challenge transmitted from the match-up opponent mobile phone, which accepts the match-up challenge of the match-up challenge mail;
- when the acceptance information about the acceptance of the match-up challenge is received, transmitting a match-up start mail, which instructs to start the match-up in the game, from the communication device to both the match-up challenger mobile phone, which transmits the opponent information indicating the opponent user selected according to the candidate list, and the match-up opponent mobile phone, which transmits the acceptance information about the acceptance of the match-up challenge, through the network.

* * * * *

UNITED STATES PATENT AND TRADEMARK OFFICE
CERTIFICATE OF CORRECTION

PATENT NO. : 8,257,178 B2
APPLICATION NO. : 12/110403
DATED : September 4, 2012
INVENTOR(S) : M. Shibahara et al.

It is certified that error appears in the above-identified patent and that said Letters Patent is hereby corrected as shown below:

At column 27, line 12 (claim 11, line 4), please delete "each" after whether.

Signed and Sealed this
Twelfth Day of March, 2013

Teresa Stanek Rea
*Acting Director of the United States Patent and Trademark Office*